United States Patent
Duan et al.

(10) Patent No.: US 11,635,505 B2
(45) Date of Patent: Apr. 25, 2023

(54) UE PASSIVE RF SENSING WITH CELLULAR-BASED BISTATIC/MULTISTATIC RADAR

(71) Applicant: QUALCOMM Incorporated, San Diego, CA (US)

(72) Inventors: Weimin Duan, San Diego, CA (US); Alexandros Manolakos, Escondido, CA (US); Seyong Park, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/171,557

(22) Filed: Feb. 9, 2021

(65) Prior Publication Data
US 2022/0252709 A1    Aug. 11, 2022

(51) Int. Cl.
| | |
|---|---|
| *G01S 13/00* | (2006.01) |
| *G01S 13/20* | (2006.01) |
| *G01S 13/44* | (2006.01) |
| *G01S 13/50* | (2006.01) |

(52) U.S. Cl.
CPC .......... *G01S 13/003* (2013.01); *G01S 13/20* (2013.01); *G01S 13/4454* (2013.01); *G01S 13/50* (2013.01)

(58) Field of Classification Search
CPC ........ G01S 13/003; G01S 13/50; G01S 13/20; G01S 13/4454; G01S 5/14; H04W 4/029; H04W 4/023
See application file for complete search history.

(56) References Cited

U.S. PATENT DOCUMENTS

| | | | | |
|---|---|---|---|---|
| 7,872,583 | B1* | 1/2011 | Yushkov | G01S 13/767 702/158 |
| 9,766,349 | B1* | 9/2017 | Madhow | G01S 19/42 |
| 10,687,303 | B2* | 6/2020 | Kurras | H04W 4/029 |
| 11,102,776 | B2* | 8/2021 | Cui | H04W 56/001 |

(Continued)

FOREIGN PATENT DOCUMENTS

| | | | |
|---|---|---|---|
| EP | 3793277 | 3/2021 | |
| EP | 3793277 A1 * | 3/2021 | ........... G01S 13/003 |
| WO | WO 2020140443 | 7/2020 | |

OTHER PUBLICATIONS

International Search Report and Written Opinion—PCT/US2021/072583—ISA/EPO—dated Feb. 25, 2022.

(Continued)

*Primary Examiner* — Erin F Heard
*Assistant Examiner* — Kenneth W Good
(74) *Attorney, Agent, or Firm* — Weaver Austin Villeneuve & Sampson LLP/Qualcomm

(57) ABSTRACT

Techniques are disclosed for determining the location of an object using RF sensing. More specifically, an object may be detected in a wireless data communication network using radar techniques in which one or more base stations act as a transmitter and a mobile device (e.g., a user equipment (UE)) acts as a receiver in a bistatic or multi-static radar configuration. By comparing the time a line-of-sight (LOS) signal is received by the mobile device with that of an echo signal from a reflection of an RF signal from the object, a position of the object can be determined. Depending on desired functionality, this position can be determined by the UE, or by a network entity.

24 Claims, 15 Drawing Sheets

(56) References Cited

U.S. PATENT DOCUMENTS

| | | | |
|---|---|---|---|
| 2005/0285787 A1* | 12/2005 | Delaveau | G01S 7/352 |
| | | | 342/464 |
| 2015/0318881 A1* | 11/2015 | Barott | H04L 27/0012 |
| | | | 375/285 |
| 2019/0037350 A1* | 1/2019 | Prevatt | G01S 13/878 |
| 2019/0072634 A1* | 3/2019 | Johnson | G01S 1/38 |
| 2020/0119780 A1* | 4/2020 | Klemmer | H04B 7/0421 |
| 2020/0142023 A1* | 5/2020 | Markhovsky | G01S 5/0218 |
| 2020/0182959 A1* | 6/2020 | Markhovsky | G01S 5/12 |
| 2020/0204958 A1* | 6/2020 | Luther | H04W 4/027 |
| 2020/0236510 A1* | 7/2020 | Perdew | H04W 4/027 |
| 2020/0236511 A1* | 7/2020 | Perdew | H04W 4/027 |
| 2020/0271749 A1* | 8/2020 | Wu | G01S 5/0278 |
| 2021/0356279 A1* | 11/2021 | Szigeti | G01C 21/3407 |
| 2021/0356582 A1* | 11/2021 | Gapin | G01S 7/006 |
| 2022/0014874 A1* | 1/2022 | Zaloom | H04W 4/027 |
| 2022/0066047 A1* | 3/2022 | Orendorff | G01C 21/20 |
| 2022/0066048 A1* | 3/2022 | Diggelen | G01S 19/37 |
| 2022/0091256 A1* | 3/2022 | Luther | G01S 13/726 |
| 2022/0107383 A1* | 4/2022 | Rappaport | G01S 5/18 |
| 2022/0159415 A1* | 5/2022 | Khoryaev | H04L 27/261 |

OTHER PUBLICATIONS

Xingqin L., et al., "Positioning for the Internet of Things: A 3GPP Perspective", IEEE Communications Magazine, IEEE Service Center, Piscataway, US, vol. 55(12), Dec. 1, 2017, pp. 179-185, XP011674414, ISSN: 0163-6804, DOI: 10.1109/MCOM.2017.1700269, [Retrieved on Dec. 13, 2017] The Whole Document.

* cited by examiner

UE PASSIVE RF SENSING WITH CELLULAR-BASED BISTATIC/MULTISTATIC RADAR

BACKGROUND

1. Field of Invention

The present invention relates generally to the field of wireless communications, and more specifically to determining the location or position of an object with radiofrequency (RF) signals using bistatic or multi-static radar techniques.

2. Description of Related Art

In a wireless communication network, RF sensing techniques can be used to determine the position of an object. Some of these positioning techniques may involve determining distance and/or angular information of RF signals transmitted by one or more base stations of the wireless communication network. These determinations, however, typically require active communications between a mobile device base stations. As such, position determination in a wireless communication network of objects that do not communicate with base stations has been limited.

An example of performing radio frequency (RF) sensing with a mobile device in a wireless communications network, according to this disclosure, comprises receiving, at the mobile device, a configuration from a server, where the configuration includes timing information for each of one or more wireless reference signals transmitted by a network entity of the wireless communications network. The method also comprises determining, with the mobile device and based on the configuration: a first time of arrival (TOA) of a line-of-sight (LOS) wireless signal at the mobile device, where the LOS wireless signal may comprise a first wireless reference signal of the one or more wireless reference signals; and a second TOA of an echo signal at the mobile device, where the echo signal may comprise a reflection, from an object, of the first wireless reference signal or a second wireless reference signal of the one or more wireless reference signals. The method also comprises determining, with the mobile device, a position of the mobile device relative to the network entity. The method also comprises determining, with the mobile device, a position of the object based on: a time difference between the first TOA and the second TOA, and the position of the mobile device relative to the network entity. The method also comprises providing the position of the object with the mobile device.

An example method of performing radio frequency (RF) sensing with a mobile device in a wireless communications network, according to this disclosure, comprises receiving, by the mobile device, a request from a server to conduct RF sensing. The method also comprises subsequent to receiving the request, receiving, at the mobile device, a configuration from a server, where the configuration includes timing information for each of one or more wireless reference signals transmitted by a network entity of the wireless communications network. The method also comprises determining, with the mobile device and based on the configuration: a first time of arrival (TOA) of a line-of-sight (LOS) wireless signal at the mobile device, where the LOS wireless signal may comprise a first wireless reference signal of the one or more wireless reference signals; and a second TOA of an echo signal at the mobile device, where the echo signal may comprise a reflection, from an object, of the first wireless reference signal or a second wireless reference signal of the one or more wireless reference signals. The method also comprises sending, from the mobile device to the server, information indicative of a time difference between the first TOA and the second TOA.

An example method of performing radio frequency (RF) sensing of an object in a wireless communications network, according to this disclosure, comprises sending a configuration from a server to a mobile device, where the configuration includes timing information for each of one or more wireless reference signals transmitted by a network entity of the wireless communications network. The method also comprises subsequent to sending the configuration, receiving, with the server, information indicative of a time difference between a first time of arrival (TOA) and a second TOA, where: the first TOA may comprise a TOA of a line-of-sight (LOS) wireless signal at the mobile device, where the LOS wireless signal may comprise a first wireless reference signal of the one or more wireless reference signals; and the second TOA may comprise a TOA of an echo signal at the mobile device, where the echo signal may comprise a reflection, from the object, of the first wireless reference signal or a second wireless reference signal of the one or more wireless reference signals. The method also comprises determining, with the server, a position of the mobile device relative to the network entity. The method also comprises determining, with the server, the position of the object based on: a time difference between the first TOA and the second TOA, and the position of the mobile device relative to the network entity. The method also comprises sending the position of the object to a device.

An example mobile device, according to this disclosure, comprises a wireless communication interface, a memory, and one or more processing units communicatively coupled with the wireless communication interface and the memory. The one or more processing units are configured to receive, via the wireless communication interface, a configuration from a server, where the configuration includes timing information for each of one or more wireless reference signals transmitted by a network entity of a wireless communications network; determine, based on the configuration: a first time of arrival (TOA) of a line-of-sight (LOS) wireless signal at the mobile device, where the LOS wireless signal may comprise a first wireless reference signal of the one or more wireless reference signals; and a second TOA of an echo signal at the mobile device, where the echo signal may comprise a reflection, from an object, of the first wireless reference signal or a second wireless reference signal of the one or more wireless reference signals. The one or more processing units are also configured to: determine a position of the mobile device relative to the network entity; determine a position of the object based on: a time difference between the first TOA and the second TOA, and the position of the mobile device relative to the network entity. The one or more processing units are also configured to provide the position of the object with the mobile device.

Another example mobile device, according to this disclosure, comprises a wireless communication interface, a memory, and one or more processing units communicatively coupled with the wireless communication interface and the memory. The one or more processing units are configured to receive, via the wireless communication interface, a request from a server to conduct radio frequency (RF) sensing. The one or more processing units are also configured to receive, via the wireless communication interface and subsequent to receiving the request, a configuration from a server, where the configuration includes timing information for each of one or more wireless reference signals transmitted by a network entity of a wireless communications network. The one or more processing units are also configured to determine, based on the configuration: a first time of arrival (TOA) of a line-of-sight (LOS) wireless signal at the mobile device, where the LOS wireless signal may comprise a first wireless reference signal of the one or more wireless reference signals; and a second TOA of an echo signal at the mobile device, where the echo signal may comprise a reflection, from an object, of the first wireless reference signal or a second wireless reference signal of the one or more wireless reference signals. The one or more processing units are also configured to send, to the server via the wireless communication interface, information indicative of a time difference between the first TOA and the second TOA.

An example server, according to this disclosure, comprises a communication interface, a memory, and one or more processing units communicatively coupled with the communication interface and the memory. The one or more processing units are configured to send, via the communication interface, a configuration to a mobile device, where the configuration includes timing information for each of one or more wireless reference signals transmitted by a network entity of a wireless communications network; subsequent to sending the configuration, receive, via the communication interface, information indicative of a time difference between a first time of arrival (TOA) and a second TOA, where: the first TOA may comprise a TOA of a line-of-sight (LOS) wireless signal at the mobile device, where the LOS wireless signal may comprise a first wireless reference signal of the one or more wireless reference signals; and the second TOA may comprise a TOA of an echo signal at the mobile device, where the echo signal may comprise a reflection, from an object, of the first wireless reference signal or a second wireless reference signal of the one or more wireless reference signals. The one or more processing units are also configured to determine a position of the mobile device relative to the network entity; determine the position of the object based on: a time difference between the first TOA and the second TOA, and the position of the mobile device relative to the network entity. The one or more processing units are also configured to send, via the communication interface, the position of the object to a device.

An example device, according to this disclosure, comprises means for receiving a configuration from a server, where the configuration includes timing information for each of one or more wireless reference signals transmitted by a network entity of a wireless communications network. The device also comprises means for determining, based on the configuration: a first time of arrival (TOA) of a line-of-sight (LOS) wireless signal at the device, where the LOS wireless signal may comprise a first wireless reference signal of the one or more wireless reference signals; and a second TOA of an echo signal at the device, where the echo signal may comprise a reflection, from an object, of the first wireless reference signal or a second wireless reference signal of the one or more wireless reference signals. The device also comprises means for determining a position of the device relative to the network entity. The device also comprises means for determining a position of the object based on: a time difference between the first TOA and the second TOA, and the position of the device relative to the network entity. The device also comprises means for providing the position of the object with the device.

Another example device, according to this disclosure, comprises means for receiving a request from a server to conduct radio frequency (RF) sensing. The device also comprises means for receiving, subsequent to receiving the request, a configuration from a server, where the configuration includes timing information for each of one or more wireless reference signals transmitted by a network entity of a wireless communications network. The device also comprises means for determining, with the device and based on the configuration: a first time of arrival (TOA) of a line-of-sight (LOS) wireless signal at the device, where the LOS wireless signal may comprise a first wireless reference signal of the one or more wireless reference signals; and a second TOA of an echo signal at the device, where the echo signal may comprise a reflection, from an object, of the first wireless reference signal or a second wireless reference signal of the one or more wireless reference signals. The device also comprises means for sending, from the device to the server, information indicative of a time difference between the first TOA and the second TOA.

Yet another example device, according to this disclosure, comprises means for sending a configuration from a device to a mobile device, where the configuration includes timing information for each of one or more wireless reference signals transmitted by a network entity of a wireless communications network. The device also comprises means for receiving, subsequent to sending the configuration, information indicative of a time difference between a first time of arrival (TOA) and a second TOA, where: the first TOA may comprise a TOA of a line-of-sight (LOS) wireless signal at the mobile device, where the LOS wireless signal may comprise a first wireless reference signal of the one or more wireless reference signals; and the second TOA may comprise a TOA of an echo signal at the mobile device, where the echo signal may comprise a reflection, from an object, of the first wireless reference signal or a second wireless reference signal of the one or more wireless reference signals. The device also comprises means for determining a position of the mobile device relative to the network entity. The device also comprises means for determining the position of the object based on: a time difference between the first TOA and the second TOA, and the position of the mobile device relative to the network entity. The device also comprises means for sending the position of the object to a device.

An example non-transitory computer-readable medium, according to this disclosure, comprises a storing instructions for performing radio frequency (RF) sensing with a mobile device in a wireless communications network. The instructions comprise code for receiving a configuration from a server, where the configuration includes timing information for each of one or more wireless reference signals transmitted by a network entity of the wireless communications network. The instructions also comprise code for determining, based on the configuration: a first time of arrival (TOA) of a line-of-sight (LOS) wireless signal at the mobile device, where the LOS wireless signal may comprise a first wireless reference signal of the one or more wireless reference signals; and a second TOA of an echo signal at the mobile device, where the echo signal may comprise a reflection, from an object, of the first wireless reference signal or a second wireless reference signal of the one or more wireless reference signals. The instructions also comprise code for determining a position of the mobile device relative to the network entity. The instructions also comprise code for determining a position of the object based on: a time difference between the first TOA and the second TOA, and the position of the mobile device relative to the network entity. The instructions also comprise code for providing the position of the object with the mobile device.

An example non-transitory computer-readable medium, according to this disclosure, stores instructions for performing radio frequency (RF) sensing with a mobile device in a wireless communications network. The instructions comprise code for receiving, by the mobile device, a request from a server to conduct RF sensing. The instructions also comprise code for, subsequent to receiving the request, receiving, at the mobile device, a configuration from a server, where the configuration includes timing information for each of one or more wireless reference signals transmitted by a network entity of the wireless communications network. The instructions also comprise code for determining, based on the configuration: a first time of arrival (TOA) of a line-of-sight (LOS) wireless signal at the mobile device, where the LOS wireless signal may comprise a first wireless reference signal of the one or more wireless reference signals; and a second TOA of an echo signal at the mobile device, where the echo signal may comprise a reflection, from an object, of the first wireless reference signal or a second wireless reference signal of the one or more wireless reference signals. The instructions also comprise code for sending, from the mobile device to the server, information indicative of a time difference between the first TOA and the second TOA.

An example non-transitory computer-readable medium, according to this disclosure, stores instructions for performing radio frequency (RF) sensing of an object in a wireless communications network. The instructions comprise code for sending a configuration from a server to a mobile device, where the configuration includes timing information for each of one or more wireless reference signals transmitted by a network entity of the wireless communications network. The instructions also comprise code for, subsequent to sending the configuration, receiving, with the server, information indicative of a time difference between a first time of arrival (TOA) and a second TOA, where: the first TOA may comprise a TOA of a line-of-sight (LOS) wireless signal at the mobile device, where the LOS wireless signal may comprise a first wireless reference signal of the one or more wireless reference signals; and the second TOA may comprise a TOA of an echo signal at the mobile device, where the echo signal may comprise a reflection, from the object, of the first wireless reference signal or a second wireless reference signal of the one or more wireless reference signals. The instructions also comprise code for determining a position of the mobile device relative to the network entity. The instructions also comprise code for determining the position of the object based on: a time difference between the first TOA and the second TOA, and the position of the mobile device relative to the network entity. The instructions also comprise code for sending the position of the object to a device.

BRIEF SUMMARY

Embodiments described herein provide for the determination of the location of an object using RF sensing. More specifically, an object may be detected in a wireless data communication network using radar techniques in which one or more base stations act as a transmitter and a mobile device (e.g., UE) acts as a receiver in a bistatic or multi-static radar configuration. By comparing the time a line-of-sight (LOS) signal is received by the mobile device with that of an echo signal from a reflection of an RF signal from the object, a position of the object can be determined. Depending on desired functionality, this position can be determined by the UE, or by a network entity.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

As used herein, an "RF signal" or "reference signal" comprises an electromagnetic wave that transports information through the space between a transmitter (or transmitting device) and a receiver (or receiving device). As used herein, a transmitter may transmit a single "reference signal" or multiple "reference signals" to a receiver. However, the receiver (or different receivers) may receive multiple "reference signals" corresponding to each transmitted RF signal due to the propagation characteristics of RF signals through multipath channels. The same transmitted RF signal on different paths between the transmitter and receiver may be referred to as a "multipath" RF signal.

Figure 1:
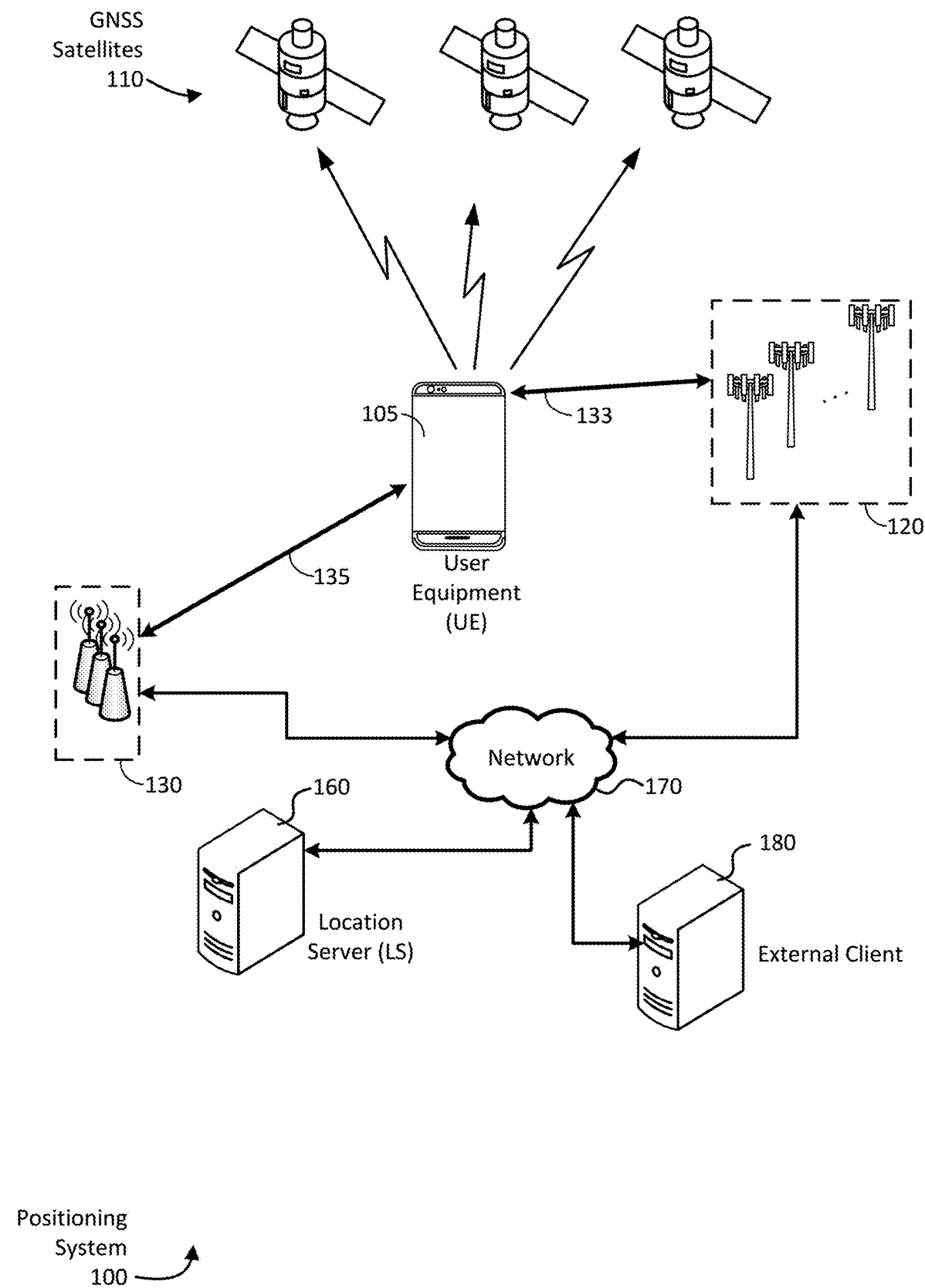
FIG. 1 is a diagram of a positioning system, according to an embodiment.

FIG. 1 is a simplified illustration of a positioning system 100 in which a UE 105, location server 160, and/or other components of the positioning system 100 can use the techniques provided herein for performing passive RF sensing as described herein, according to an embodiment. It can be noted, however, that techniques described herein are not necessarily limited to a positioning system 100. The techniques described herein may be implemented by one or more components of the positioning system 100. The positioning system 100 can include a UE 105, one or more satellites 110 (also referred to as space vehicles (SVs)) for a Global Navigation Satellite System (GNSS) such as the Global Positioning System (GPS), base stations 120, access points (APs) 130, location server 160, network 170, and external client 180. Generally put, the positioning system 100 can estimate location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 105 and a neighbor base station whose reference RF signals the UE 105 is measuring.

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate the location determination. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, location of the UE 105 estimated at least in part based on measurements of RF signals communicated between the UE 105 and one or more other UEs (not shown in FIG. 1), which may be mobile. Direct communication between UEs in this manner may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

As previously noted, the example positioning system 100 can be implemented using a wireless communication network, such as an LTE-based or 5G NR-based network. 5G NR is a wireless RF interface undergoing standardization by the 3rd Generation Partnership Project (3GPP). 5G NR is poised to offer enhanced functionality over previous generation (LTE) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell Round Trip signal propagation Time (RTT) positioning. With regard to RTT positioning, this involves taking RTT measurements between the UE and multiple base stations.

Figure 2:
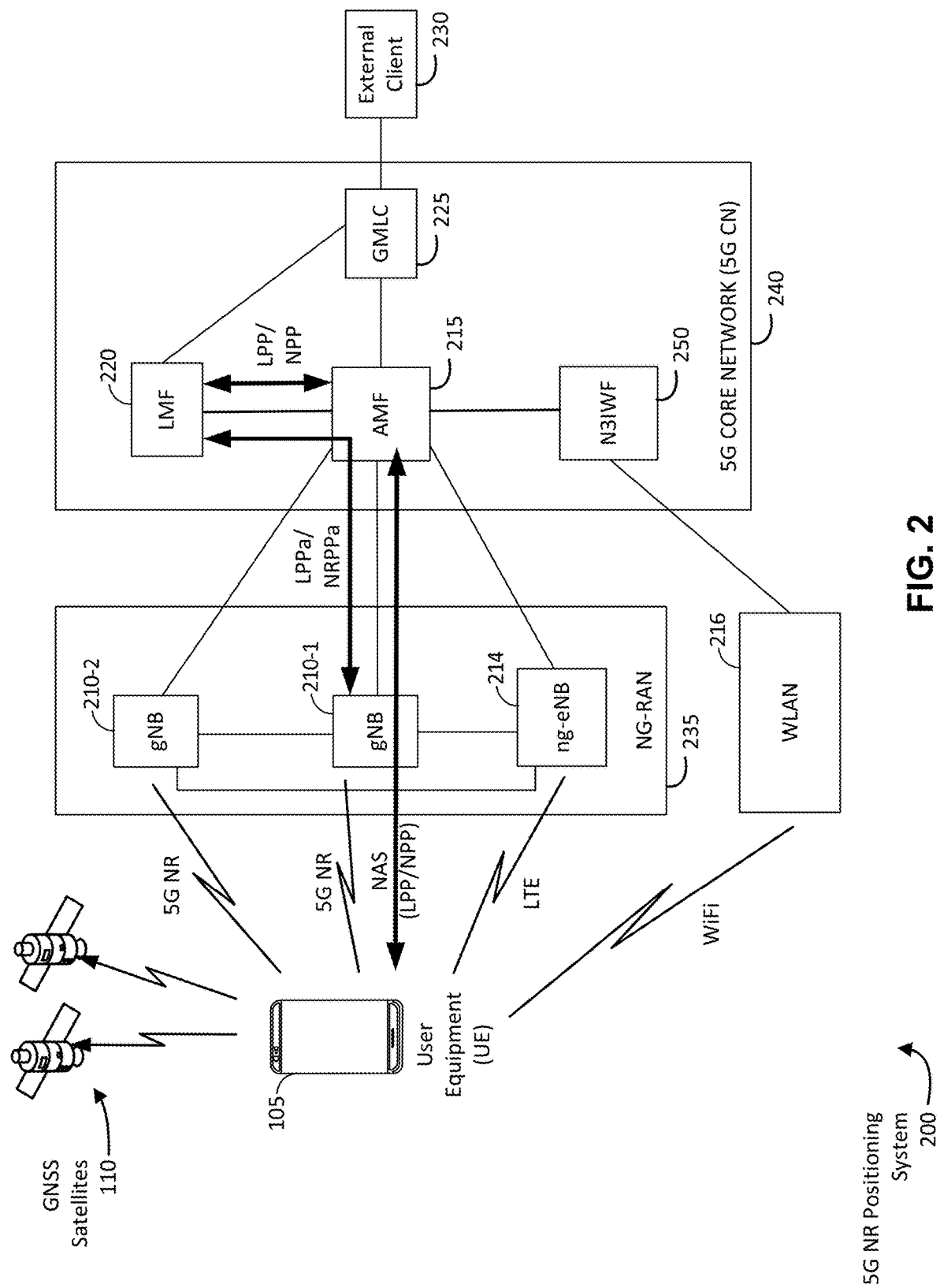
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate indirectly via another component of the 5G NR positioning system 200, such as the LMF 220.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250—e.g. if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105) and/or obtain measurements from the UE 105 that are transferred to the access node using one or more of the multiple RATs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematics (RTK), Precise Point Positioning (PPP), Differential GNSS (DGNSS), ECID, angle of arrival (AoA), angle of departure (AoD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220 or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to a location server (e.g., LMF 220) for computation of a location estimate for UE 105. Location measurements may include one or more of a Received Signal Strength Indication (RSSI), RTT, Reference Signal Receive Power (RSRP), Reference Signal Received Quality (RSRQ), Time of Arrival (ToA), AoA, Differential AoA (DAoA), AoD, or Timing Advance (TA) for gNBs 210, ng-eNB 214, and/or one or more access points for WLAN 216. The location measurements may also or instead include measurements of RAT-independent positioning methods such as GNSS (e.g., GNSS pseudorange, GNSS code phase, and/or GNSS carrier phase for GNSS satellites 110), WLAN, etc. With a UE-based position method, UE 105 may obtain location measurements (e.g., which may be the same as or similar to location measurements for a UE assisted position method) and may further compute a location of UE 105 (e.g., with the help of assistance data received from a location server such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or ToA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

In a 5G NR positioning system 200, some location measurements taken by the UE 105 (e.g., AoA, AoD, ToA) may use RF reference signals received from base stations 210 and 214. These signals may comprise PRS, which can be used, for example, to execute OTDOA, AoD, and RTT-based positioning of the UE 105. Other reference signals that can be used for positioning may include Cell-specific Reference Signal (CRS), Channel State Information Reference Signal (CSI-RS), synchronization signals (e.g., synchronization signal block (SSB) Synchronizations Signal (SS)), etc. Moreover, the signals may be transmitted in a Tx beam (e.g., using beamforming techniques), which may impact angular measurements, such as AoD.

Figure 3:
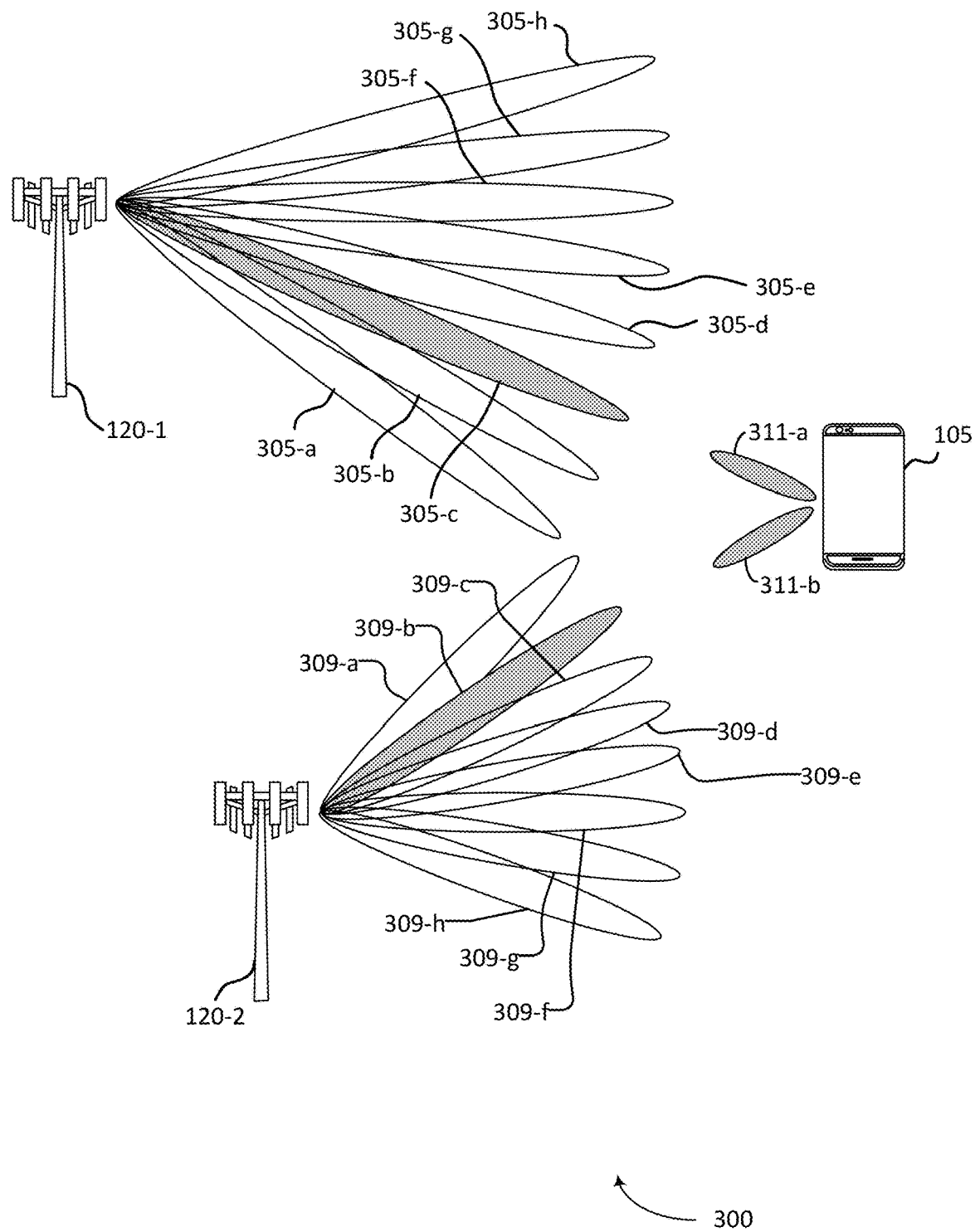
FIG. 3 is a diagram illustrating beamforming in a 5G NR positioning system.

FIG. 3 is a diagram illustrating a simplified environment 300 including two base stations 120-1 and 120-2 (which may correspond to base stations 120 of FIG. 1 and/or gNBs 210 and/or ng-eNB 214 of FIG. 2) producing directional beams for transmitting RF reference signals, and a UE 105. Each of the directional beams is rotated, e.g., through 120 or 360 degrees, for each beam sweep, which may be periodically repeated. Each direction beam can include an RF reference signal (e.g., a PRS resource), where base station 120-1 produces a set of RF reference signals that includes Tx beams 305-$a$, 305-$b$, 305-$c$, 305-$d$, 305-$e$, 305-$f$, 305-$g$, and 305-$h$, and the base station 120-2 produces a set of RF reference signals that includes Tx beams 309-$a$, 309-$b$, 309-$c$, 309-$d$, 309-$e$, 309-$f$, 309-$g$, and 309-$h$. Because UE 105 may also include an antenna array, it can receive RF reference signals transmitted by base stations 120-1 and 120-2 using beamforming to form respective receive beams (Rx beams) 311-$a$ and 311-$b$. Beamforming in this manner (by base stations 120 and optionally by UEs 105) can be used to make communications more efficient. It can also be used for other purposes, such as transmitting reference signals for RF sensing of an object. (An object detected using the radar techniques described herein is also referred to herein as a "target.")

As previously noted, network-based positioning of a target traditionally requires measurements and/or communications by the target. RTT-based positioning, for example, requires a target to transmit and receive signals. AoD-based positioning requires a target to make a RSRP measurement for AoD determination. As such, network-based positioning was traditionally limited to a UE 105, which is capable of taking measurements and communicating with base stations.

Figure 4:
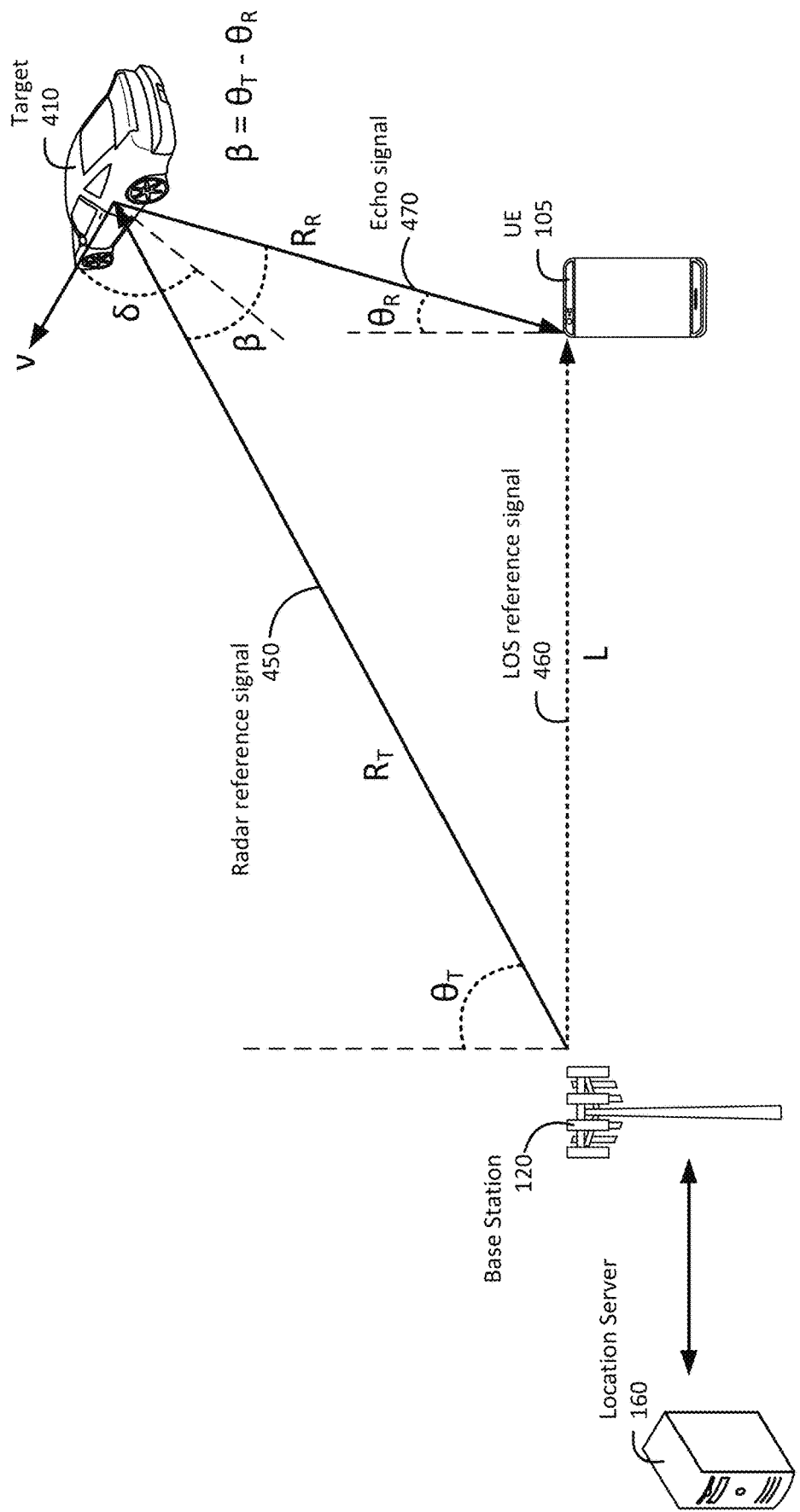
FIG. 4 is a simplified diagram illustrating how radiofrequency (RF) sensing of a target may be performed, according to an embodiment.

Embodiments described herein provide for determining the location of a target using RF sensing in a wireless communication network, in which one or more base stations can act as a transmitter and one or more UEs can as a receiver in a bistatic or multi-static radar configuration. By comparing the time a line-of-sight (LOS) signal is received by a UE with that of an echo signal from a reflection of an RF signal from the target, a position of the target can be determined. Depending on desired functionality, this position can be determined by the UE, or by a network entity. FIG. 4 helps illustrated how this is accomplished.

FIG. 4 is a simplified diagram illustrating how RF sensing can be used to determine the position of a target 410, according to an embodiment. Here, RF sensing is performed using a bistatic radar configuration, where the base station 120 (which may comprise a serving base station for the UE 105) performs the function of a radar transmitter and the UE 105 performs the function of a radar receiver. Here, positioning of the target 410 is accomplished by transmitting one or more reference signals 450, 460 from a base station 120, receiving an LOS reference signal 460 and echo signal 470 at the UE 105, and calculating the position of the target 410 based on a difference in time at which these signals are received at the UE 105, along with known positions of the UE 105 and base station 120. This process may be facilitated with the use of a location server 160. As discussed in more detail below, the UE 105 or location server 160 may determine the position of the target 410, depending on desired functionality.

It can be noted that, although a bistatic configuration is illustrated in FIG. 4, embodiments are not so limited. According to some embodiments, multi-static configurations may be used in which there are a plurality of base stations 120 (transmitters) and/or a plurality of UEs 105 (receivers). In such configurations, a position of the target 410 can be determined as described herein for each transmitter/receiver pair, then determinations for all transmitter/receiver pairs can be combined. In such configurations, this can increase accuracy and/or reliability of position determination of the target 410.

The position of the target 410 can be determined mathematically by solving for the distance, $R_R$, of the target 410 from t UE 105, as well as angle, $\theta_R$. It can be noted that the reference direction from which the angle $\theta_R$ (and angle $\theta_T$) is measured may be measured from true north or based on any coordinate system used by the network for positioning (e.g., geographical coordinates, East-North-Up (ENU), etc.). As noted hereafter, solving for $R_R$ and $\theta_R$ can be accomplished based on a known position of the UE 105 relative to base station 120 (to determine distance L). This position can be determined using any of the positioning techniques previously described with regard to FIGS. 1-3, including GNSS-based decisioning and/or network-based positioning (e.g., positioning using multi-RTT, DL-TDOA, and/or AoD measurements etc.).

The distance $R_R$ can be determined based on a time difference at the UE 105 of receiving the LOS reference signal 460 and echo signal 470. $R_{sum}$ may be defined as follows:

$$R_{sum}=R_T+R_R \tag{1}$$

where $R_T$ is the distance between the base station 120 and target 410, and $R_R$ is the distance between the target 410 and UE 105. Using equation (1) and the geometry illustrated in FIG. 4, $R_R$ may then be determined as follows:

$$R_R = \frac{R_{sum}^2 - L^2}{2(R_{sum} + L*\sin\theta_R)}. \quad (2)$$

$R_{sum}$ can be determined using (i) the time difference between the LOS reference signal 460 and echo signal 470, and (ii) the known distance between the base station 120 and UE 105. This can be expressed mathematically as:

$$R_{sum} = (T_{Rx\_echo} - T_{Rx_{LOS}} - \Delta)*c + L \quad (3)$$

where L is the distance between the base station 120 and UE 105, $T_{RX\_echo}$ is the time (e.g., ToA) at which the echo signal 470 is received at the UE 105, $T_{Rx\_LOS}$ is the time (e.g., ToA) at which the LOS reference signal 460 is received at the UE 105, and c is the speed of RF signals 450, 460, and 470 (e.g., the speed of light). Again, because the location of the UE 105 is known (or can be determined beforehand), distance L can be determined based on the UE location and the known location of the base station 120 (e.g., from an almanac of base station locations stored by the location server 160 and/or UE 105).

The term Δ represents a time gap (if any) between the transmission of the LOS reference signal 460 and the transmission of the radar reference signal 450. As discussed in more detail below, in some instances the LOS reference signal 460 and radar reference signal 450 may be the same RF signal, in which case the value for time gap Δ would be zero. In embodiments where the UE 105 determines the difference $T_{Rx\_echo} - T_{Rx_{LOS}}$, timing of LOS reference signal 460 and radar reference signal 450 may be provided to the UE 105 beforehand (e.g., in a communication session with the location server 160 or in a configuration provided to the UE 105 by the serving base station 120). Because this difference is dependent solely on when signals arrive, rather than when they are transmitted, no synchronizations needed between the transmitter (base station 120) and receiver (UE 105). This can be advantageous in many circumstances.

Returning to equation (2), to solve for $\theta_R$ embodiments can use different techniques, depending on desired functionality and other factors. Because $\theta_R$ is an AoA at the UE 105, the UE 105 may simply take an AoA measurement of the echo signal 470. An AoA measurement can comprise determining which receive beam (e.g., as illustrated in FIG. 3) has the highest RSRP value, and (optionally) performing super resolution/interpolation techniques to determine an accurate AoA. Additionally or alternatively, such as in instances where a UE 105 may not be capable of measuring AoA, multiple receivers (e.g., multiple UEs 105) can be used (or a single UE 105 at multiple locations (if target 410 is static)) to determine $\theta_R$ using multilateration. (Multilateration may be used in other ways to determine the location of target 410, as discussed hereafter with regard to FIG. 10.)

Having determined the values of L, $R_{sum}$, and $\theta_R$, the value for $R_R$ can be determined using equation (2), and the location of the target 410 (relative to the UE 105) can be determined using $R_R$ and $\theta_R$. Further, if the absolute position of the UE 105 is known, the absolute position of the target 410 can be determined.

According to some embodiments, a Doppler frequency for the target 410 can be determined in cases where the transmitter (base station 120) and receiver (UE 105) are both static. (Where UE 105 comprises a mobile device this may mean the UE 105 is temporarily immobile or has limited/low mobility (e.g., movement of several m/s or less)—at least for the duration of the radar measurements. Movement at the UE 105 can be determined using sensor information, GNSS or other positioning measurements, etc.) Target bistatic Doppler frequency $f_D$ can be determined as:

$$f_D = \frac{2v}{c} * \cos\delta * \cos(\beta/2), \quad (4)$$

where velocity v and angles β and δ are related to the target 410, radar reference signal 450, and echo signal 470 as illustrated in FIG. 4. Thus, techniques provided herein may enable RF sensing of a target 410 that can be used to determine location and velocity of the target.

Figure 5A:
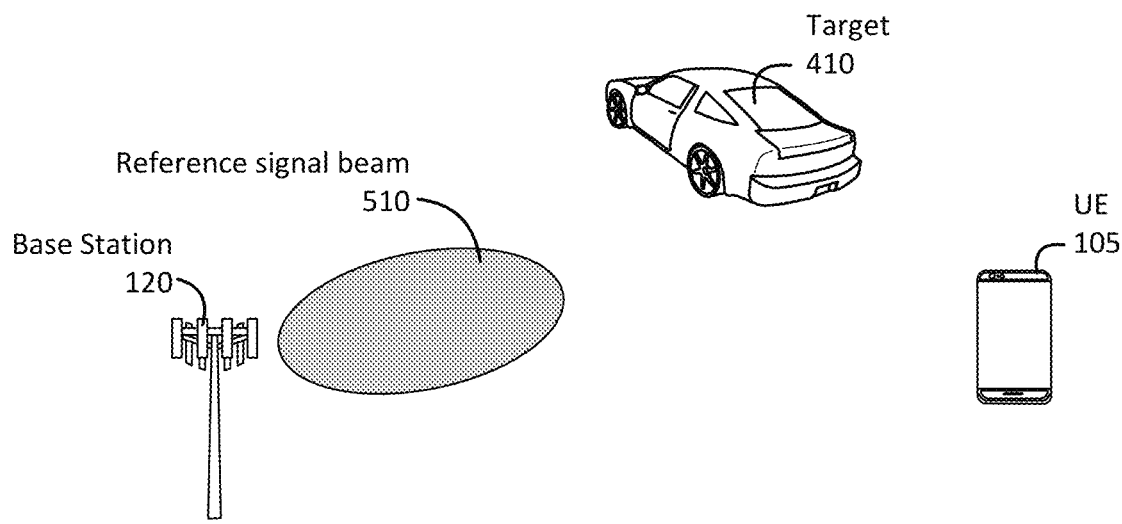
FIGS. 5A and 5B are diagrams of a base station, target, and UE, provided to illustrate how beams may be used differently in different embodiments and/or situations, depending on desired functionality.
Figure 5B:
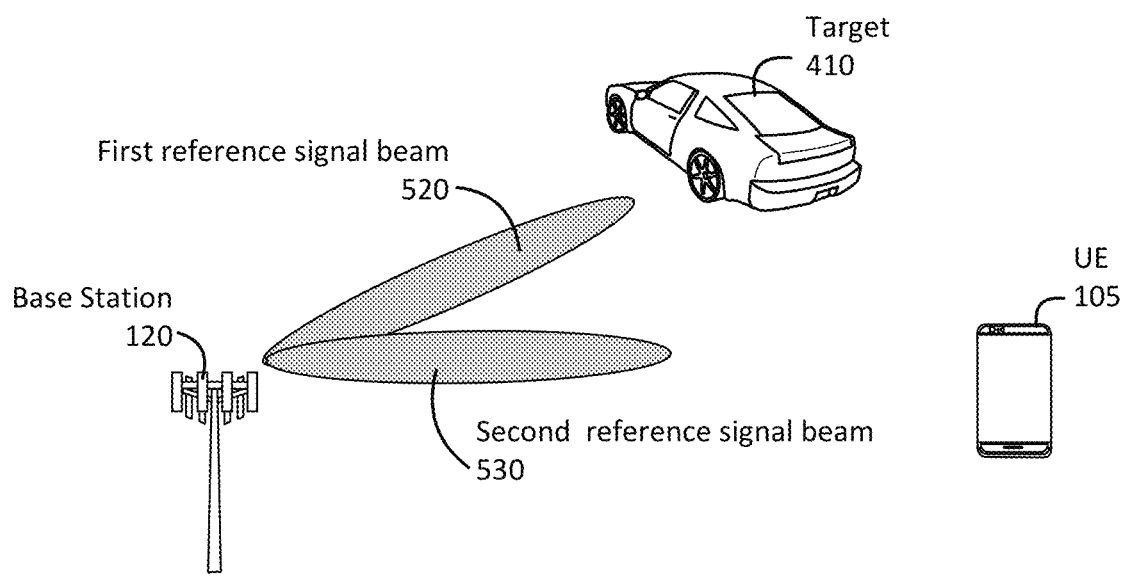

As previously noted, embodiments may use a single reference signal or different reference signals for the radar reference signal 450 and LOS reference signal 460. FIGS. 5A and 5B and the following description provide additional details.

FIGS. 5A and 5B are diagrams of configurations of a base station 120, target 410, and UE 105 similar the configuration shown in FIG. 4, provided to illustrate how beams may be used differently in different embodiments and/or situations, depending on desired functionality. In FIG. 5A, for example, a single reference signal beam 510 is wide enough to be reflected from the target 410 and received by the UE 105, allowing it to be used in the previously-described process regarding determining $R_{sum}$. As can be seen, whether the reference signal beam 510 is sufficiently wide may depend not only on the width of the reference signal beam, but also how close the target 410 and the UE 105 are to each other. (In some instances, for example, the target 410 and UE 105 may be sufficiently close such that a relatively narrow beam—as illustrated in FIG. 5B, for example—may be both reflected from the target 410 and received by the UE 105.) In FIG. 5B, however, the target 410 is aligned with a first reference signal beam 520, and a UE 105 is more aligned with a second reference signal beam 530. In such instances, even if the UE 105 is capable of detecting both first reference signal beam 520 and a second reference signal beam 530, it may be preferable for the UE 105 to take a ToA measurement of the second reference signal beam 530, rather than the first reference signal beam 520 (e.g., due to more favorable SNR values to take a ToA measurement).

Figure 6:
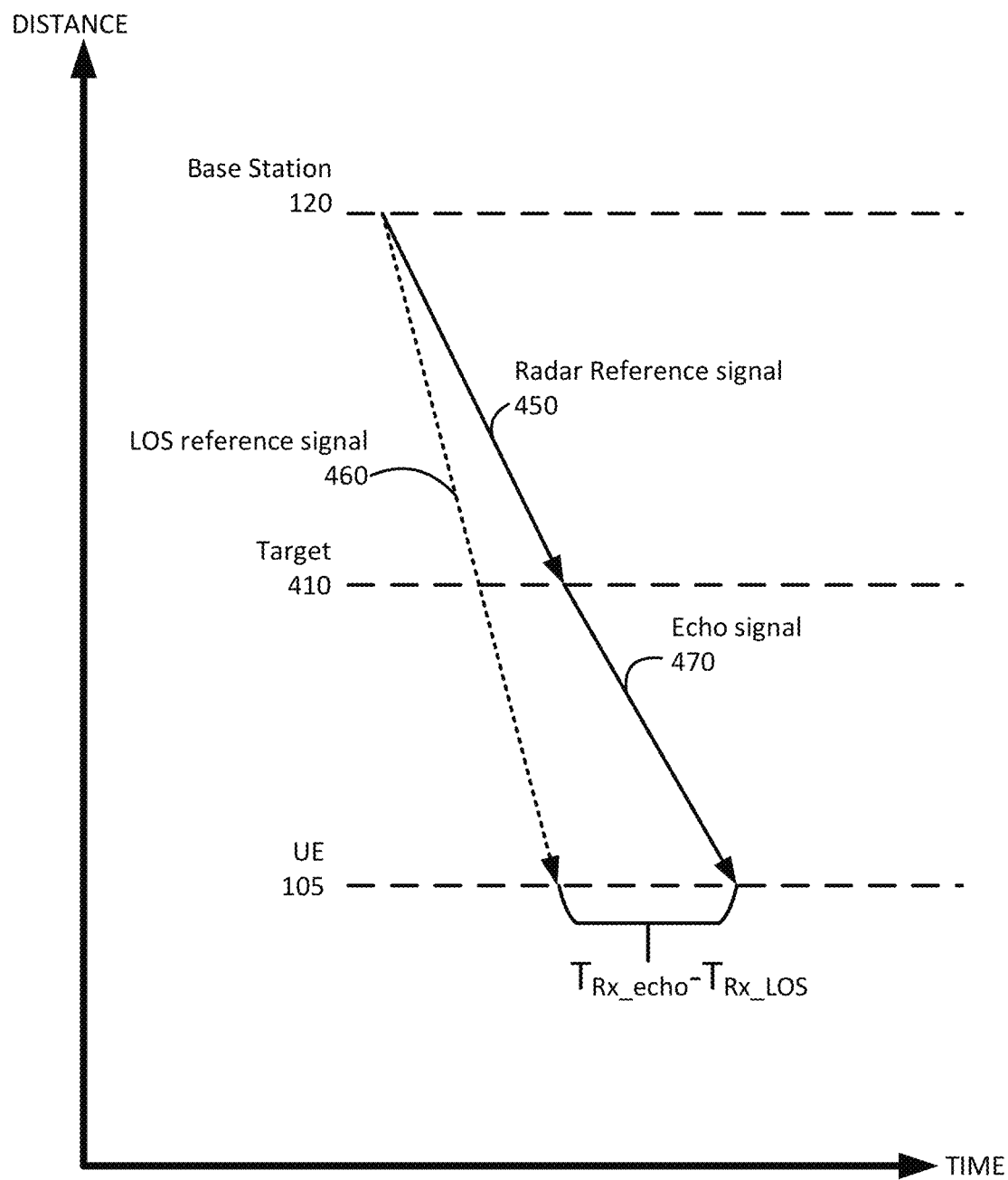
FIGS. 6 and 7 are time-distance diagrams illustrating how timing can be used to determine certain mathematical values related to the configuration shown in FIG. 4, according to an embodiment.
Figure 7:
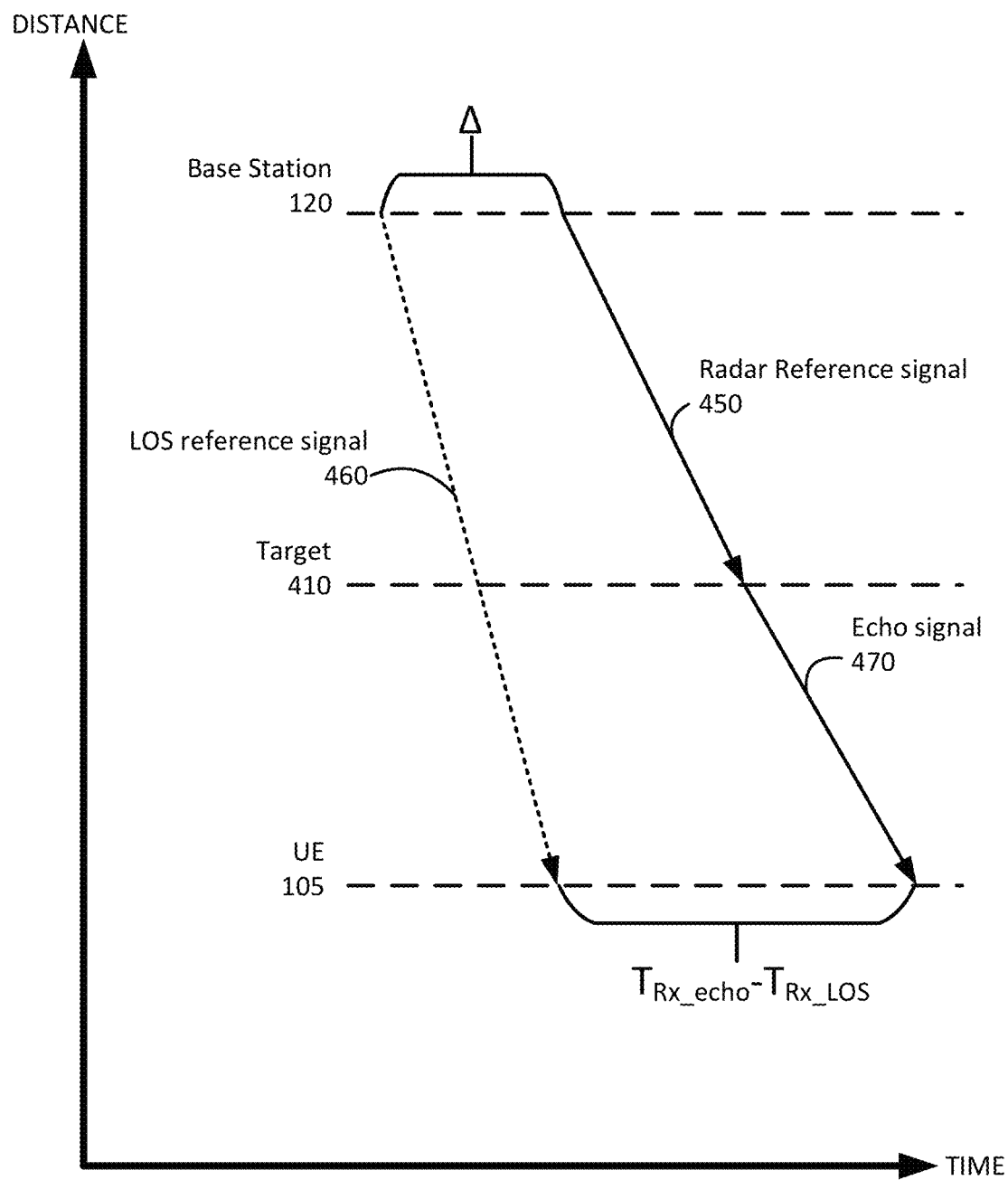

As noted, although reference signals using reference signal beams 520, 530 may be transmitted at different times, because the time difference in the transmission of first reference signal beam 520 and the second reference signal beam 530 is known, this time difference can be accounted for by time gap Δ in equation (3), allowing for the determination of $R_{sum}$ in cases where different reference signal beams transmitted at different times are used. FIGS. 6 and 7 are provided to help illustrate how embodiments may determine $R_{sum}$ when a time gap Δ is or is not present.

FIG. 6 is a time-distance diagram illustrating how timing can be used to determine $R_{sum}$ in the configuration shown in FIG. 4, according to an embodiment. Here, a base station 120 transmits the LOS reference signal 460 and radar reference signal 450 at the same time. Thus, in this case, the LOS reference signal 460 and radar reference signal 450 may comprise the same signal (e.g., a DL-PRS), which may be transmitted using a single reference signal beam, as illustrated in FIG. 5A. The different angles of reference signals 450 and 460 illustrated in FIG. 5 reflect the different paths of reference signals 450 and 460 in FIG. 4.

As noted, the location server 160 may coordinate the transmission and measurement of the reference signals 450 and 460 by providing information to the base station 120 regarding how to transmit the reference signals 450 and 460, as well as information to the UE 105 regarding when to measure the reference signals 450 and 460. Further, depending on desired functionality, a single reference beam may be used for the determination of distance $R_{sum}$ as described in relation to FIGS. 4 and 5A.

FIG. 7 is a time-distance diagram, similar to FIG. 6, providing another illustration of how timing can be used to determine $R_{sum}$ in the configuration shown in FIG. 4, according to an embodiment. In this case, the base station 120 transmits the LOS reference signal 460 and radar reference signal 450 different times: the radar reference signal 450 is transmitted after LOS reference signal 460. As illustrated in FIG. 5B, these reference signals may be transmitted using two beams. A time gap Δ represents the amount of time between the transmission of the radar reference signal 450 and the transmission of LOS reference signal 460. Again, the location server 160 may coordinate the transmission and measurement of the reference signals 450 and 460 by providing information to the base station 120 regarding how to transmit the reference signals 450 and 460, as well as information to the UE 105 regarding when to measure the reference signals 450 and 460. Thus, the time gap Δ may be determined by the UE 105 based on the configuration received from the location server, which may be relayed to the UE 105 by the base station 120.

Figure 8:
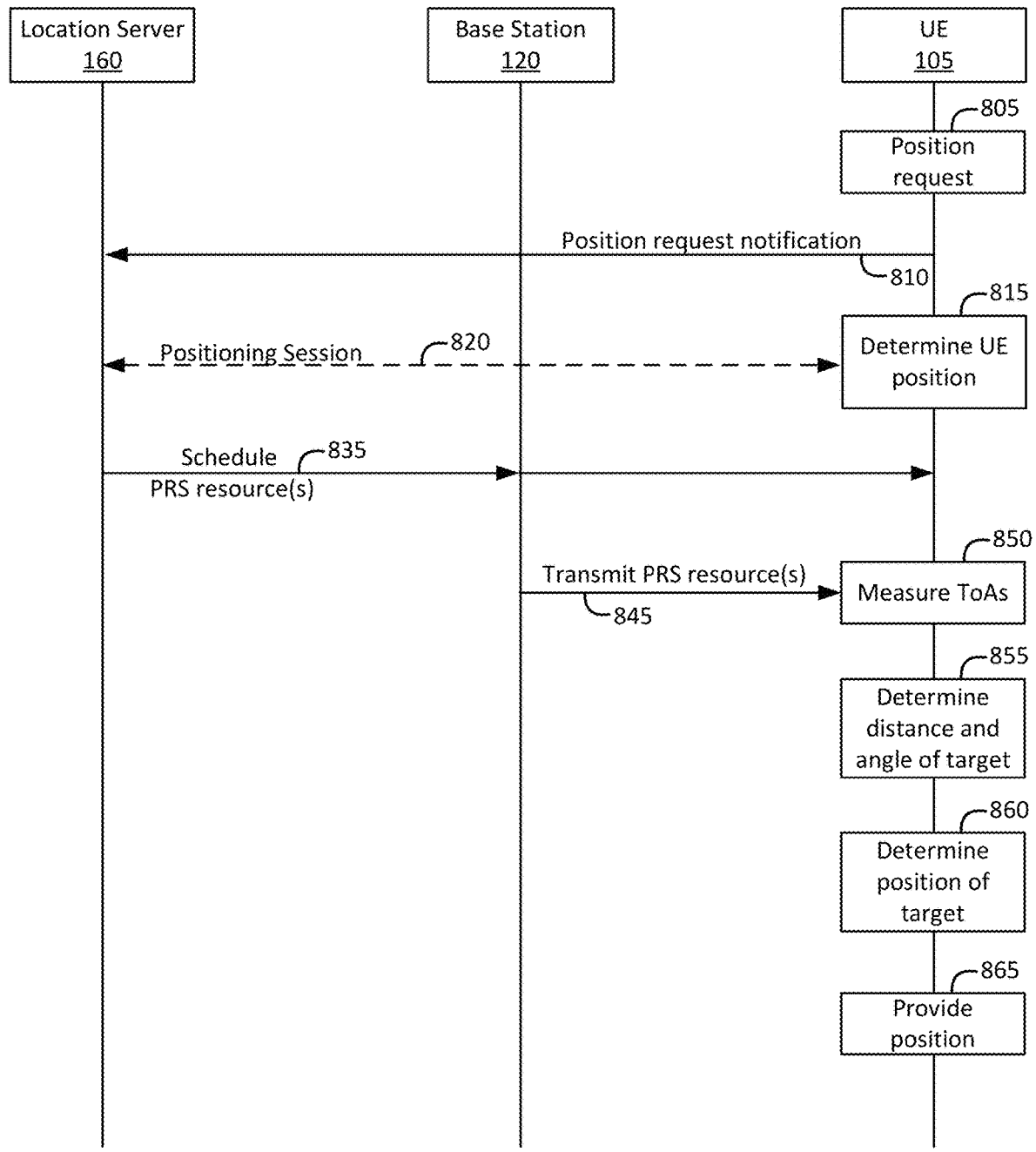
FIGS. 8 and 9 are call-flow diagrams of processes of performing position determination of a target, according to some embodiments.
Figure 9:
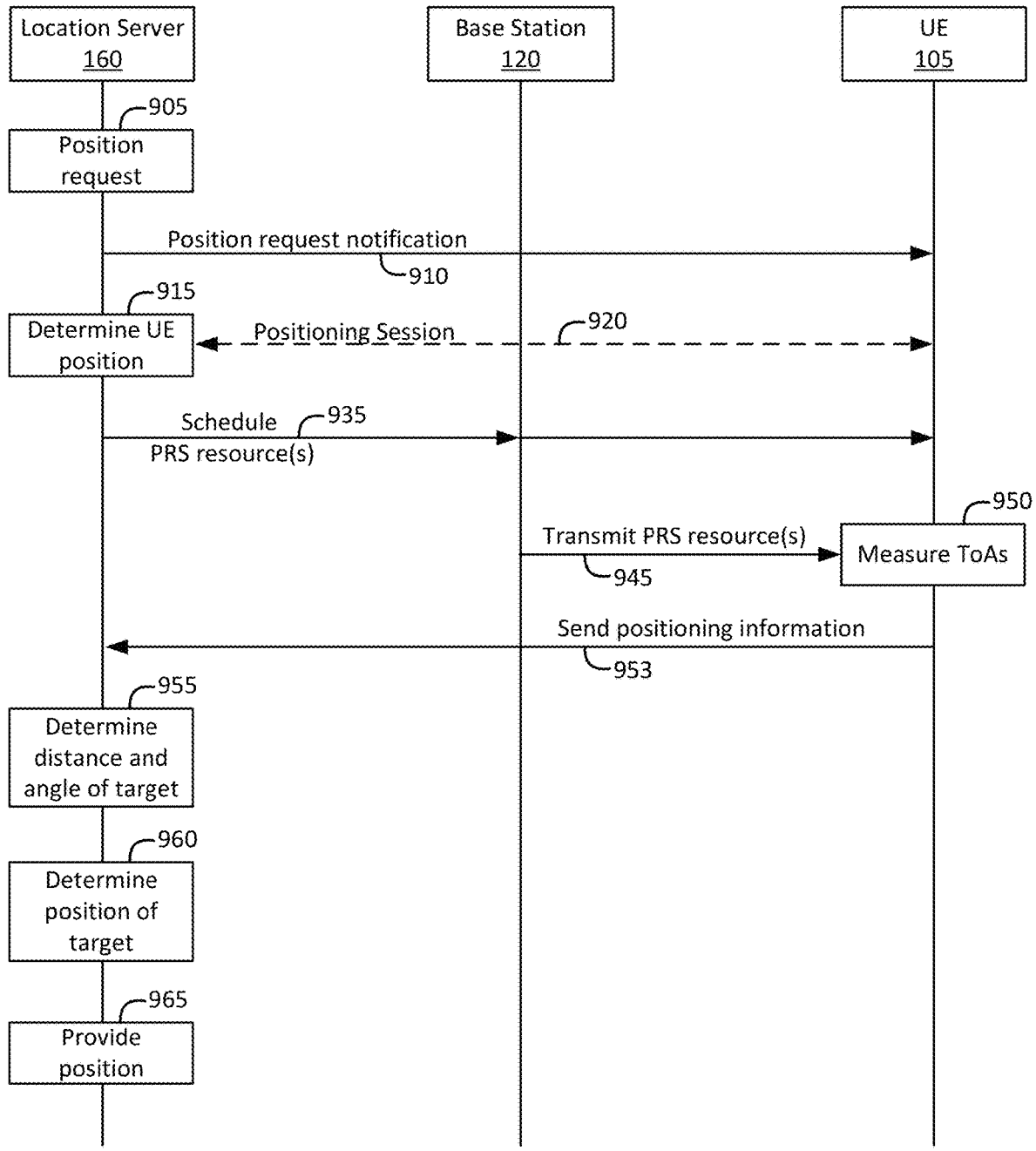

The calculation of the position of the target 410 and/or values distance $R_T$ and angle $\theta_R$ may be performed by different entities, depending on desired functionality. This may depend, for example, on whether a request for the position of the target 410 comes from the UE 105 or whether the request for the position of the target 410 comes from the network or other entity (such as the external client 180 of FIG. 1 or external client 230 of FIG. 2). Accordingly, different processes can be used to determine the position of the target 410. FIGS. 8 and 9 illustrate two example processes. It can be noted, however, that embodiments are not limited to the "positioning" of an object per se. RF sensing in the manner described herein may be conducted to obtain additional or alternative types of information regarding one or more objects/targets (e.g., object detection, identification, movement/object tracking, etc.)

FIG. 8 is a call-flow diagram illustrating an embodiment of a process of performing UE-based (or UE-initiated) RF sensing of a target 410. As with the other figures provided herein, FIG. 8 is provided as a nonlimiting example. As discussed in more detail below, alternative embodiments may perform certain functions (e.g., the determination of the UE position, the AoD measurement, the ToA measurements, etc.) in a different order, simultaneously, etc. It can be noted that arrows between the various components illustrated in FIG. 8 illustrate messages or information sent from one component to another. It will be understood, however, that there may be any number of intervening devices, servers, etc. that may relay such messages, including other components in FIG. 8. (E.g., a message from the UE 105 to the location server 160 may pass through the base station 120, which may be the serving base station for the UE 105.) Additionally, although wireless reference signals are referred to as PRS resources (e.g., DL-PRS transmitted by the base station 120), alternative embodiments may utilize other wireless reference signal types. As noted, in some embodiments, a radar reference signal (e.g., radar reference signal 450) may be a reference signal specialized to facilitate radar detection.

At block 805, the target 410 receives a position request. This position request may come, for example, from an application (or app) executed by the target 410. This may be a result from user interaction with the target 410, based on a determined schedule, or based on other triggers (including user input). Additionally or alternatively, a position request may come from a separate device. In some instances, for example, the target 410 itself may be capable of communicating with the UE 105 and requesting its position.

In response, the target 410 may generate a position request notification. As indicated at arrow 810, the request can be sent to the location server 160, which can coordinate the transmission of the PRS resources (or other reference signals) by the base station 120 to determine of the position of the target 410. According to some embodiments, additional communications between the target 410 and location server 160 may occur to determine capabilities of the target 410 (including, for example, the capability of the UE 105 to detect the location of the target 410). In some embodiments, communication between the location server 160 and target 410 may occur via an LPP positioning session.

At block 815, the UE 105 determines its position. This can be performed in any of a variety of ways, including GNSS and/or other non-network means. Additionally or alternatively, position determination for the UE 105 can be network-based and may involve the location server 160. In such instances, the UE 105 and a location server 160 may engage in a positioning session as shown by arrow 820. Depending on desired functionality, this may be a positioning session separate from an earlier positioning session initiated to determine the location of the target 410 or may be incorporated into the earlier positioning session. In some embodiments, the UE 105 may obtain a high-accuracy position determination based on, for example, multi-RTT positioning based on communication with a plurality of base stations (which may include communication with the base station 120). For multi-RTT positioning, assistance data may be obtained from the location server 160 (e.g., in positioning session at arrow 820) may include a location of each base station with which RTT measurements are made.

As indicated by arrow 835, the location server can then schedule the transmission and receipt of PRS resources by the base station 120 and UE 105. More specifically, the scheduling of PRS resources may involve the location server 160 configuring the base station 120 to transmit the one or more PRS resources, and/or the location server 160 or base station 120 configuring the UE 105 to measure the one or more PRS resources.

At block 845, the base station 120 transmits the one or more PRS resources. As described in the earlier embodiments, the one or more PRS resources may comprise a single RF signal transmitted using a wide beam (e.g., as shown in FIG. 5A) or separate RF signals transmitted using separate names (e.g., as shown in FIG. 5B). In either case, the UE 105 can measure the ToA of both the LOS reference signal 460 and echo signal 470. The measurement of these ToAs is shown at block 850. As mentioned, the UE 105 may also take an AoA measurement of the echo signal 470 to determine the angle $\theta_R$ of the target.

At block 855, the UE 105 determines the distance and angle of the target. This can be done using the processes described above for determining distance ($R_R$) and angle ($\theta_R$). Again, the angle of the target 410 may be determined using an AoA measurement or using multilateration. In the case of multilateration, additional measurements (e.g. ToA measurements of the echo signal from the PRS resource transmitted at arrow 845, or from another PRS resource) may be obtained from other UEs, or (if the target 410 is static) may be obtained by the UE 105 itself, at different times and in different locations.

At block 860, the UE 105 determines the position of the target 410. This can be done by using equations (1)-(3) in the manner previously described. More specifically, using the angle and distance of the target 410 as determined at block 855, and a known location for the UE 105, the UE 105 can determine the position of the target 410. This determined position can then be provided by the UE 105, as indicated at block 865.

The way in which the position of the target 410 is provided at block 865 may be dependent on the way in which the position was requested at block 805. If, for example, the position of the target 410 was requested by an application executed at the UE 105, providing the position may therefore comprise providing the position to an application layer (e.g., from a lower layer that determined the position of the target). If requested by a user of the UE 105, the UE 105 can provide the position visibly and/or audibly (e.g., using a display and/or speakers of the UE 105). If the position of the target 410 was requested by the target 410 itself, the UE 105 can communicate the position back to the target 410.

FIG. 9 is call-flow diagram illustrating an embodiment of a process of performing UE-assisted (or network-initiated) RF sensing of a target 410. Here, calculations and position determination are performed at the location server 160, based on information received from the UE 105 and target 410. Many of the operations performed in the process of FIG. 9 may be similar to the operations performed in the process of FIG. 8, as previously described.

This process may begin with a position request obtained at the location server 160, as indicated at block 905. As indicated previously, UE-assisted (or network-based) positioning can be based on a request from an external client (e.g., external client 180 of FIG. 1 and/or external client 230 of FIG. 2). Additionally or alternatively, the request may come from a service within the wireless network that may need the position of the target 410 to provide particular functionality.

In response to the position request, the location server 160 may notify the UE 105 of the position request via position request notification, as indicated at arrow 910. In some embodiments, this may comprise initiating a communication session between the location server 160 and UE 105.

The determination of the UE position at block 915 is made by the location server, in which case a positioning session 920 may be conducted to determine the location of the UE 105 using network-based positioning. Alternatively, if the UE 105 knows or can obtain its position separate from the network (e.g., using GNSS positioning), the UE 105 may provide its position to the location server 160. Elements 935-950 may be similar to corresponding features in FIG. 8, as previously described.

Once the UE 105 measures the ToAs at block 950, it can send positioning information to the location server 160, as indicated at action 953. This positioning information may comprise the measurements themselves and/or information indicative of a time difference between the ToAs.

Elements 955-965 may be similar to corresponding elements in FIG. 8. The difference in FIG. 9, however, is that these operations are performed at the location server 160. That is, using the positioning information sent by the UE 105 at action 953, the location server can determine the distance and angle of the target 410 and, ultimately, determine the position of the target 410, using the techniques described above or similar thereto. Providing the position of the target 410 at block 965 may comprise communicating the position to a requesting entity (e.g., the entity providing the position request at block 905).

Figure 10:
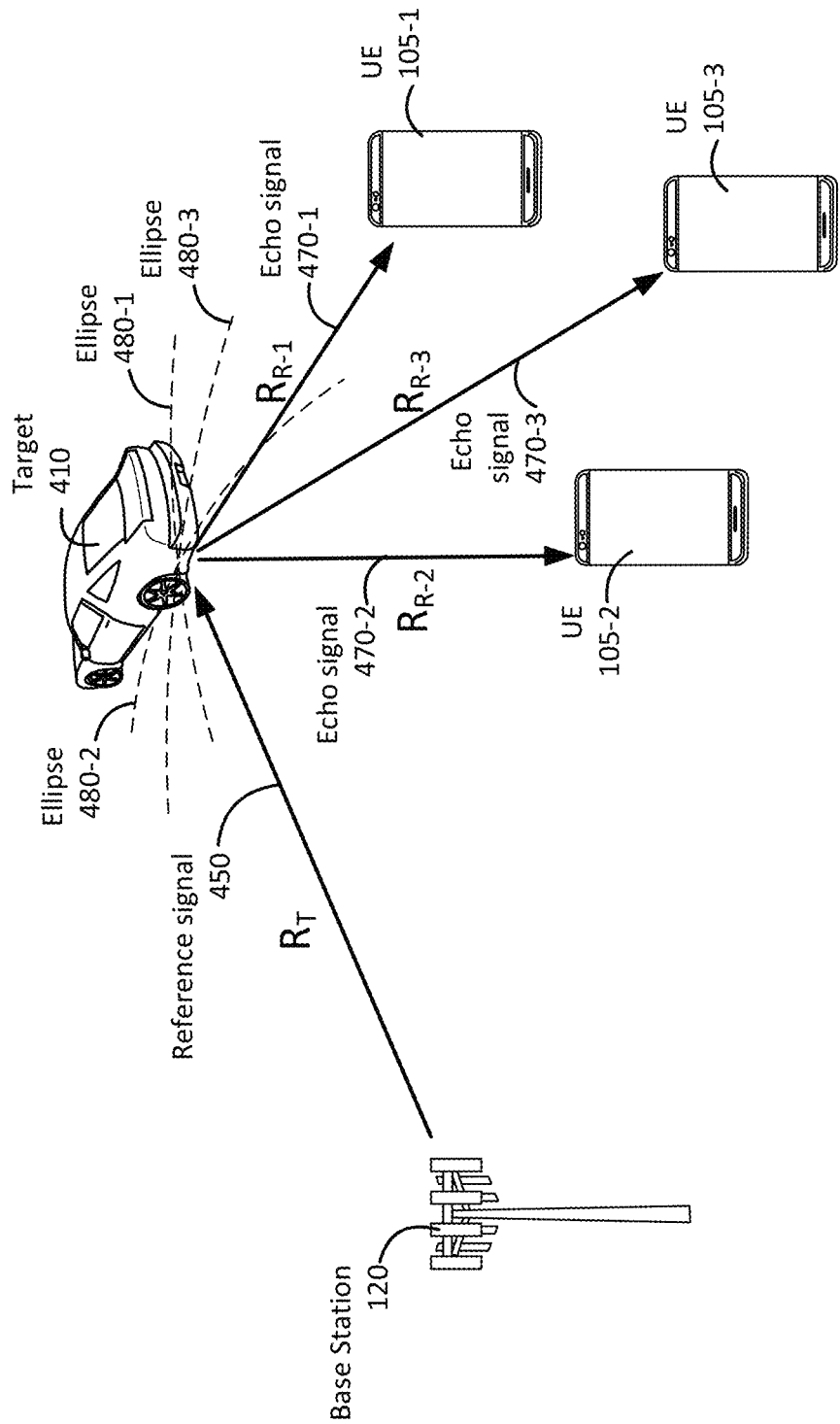
FIG. 10 is a simplified diagram, similar to FIG. 4, illustrating how RF sensing of a target may be performed, according to another embodiment.

FIG. 10 is a simplified diagram illustrating a variation to the configuration illustrated in FIG. 4, which may be performed according to embodiments. Here, rather than a single UE 105, multiple UEs 105-1, 105-2, and 105-3 (collectively and generically referred to herein simply as UEs 105) are used. To reduce clutter, the location server 160 has been removed from FIG. 10, although, as indicated below, a location server 160 may be used in a manner similar to the manner described with respect to FIG. 4.

The process of determining the location of the target 410 may be generally similar to the process illustrated in FIG. 4 and described in conjunction with FIGS. 4-9. However, because multiple UEs 105 are used, angle information may not be needed. That is, rather than (or in addition to) determining the position of the target 410 using distance $R_R$ and angle $\theta_R$, the position may be determined instead using multi-lateration. To do so, each UE 105 may receive a respective echo signal 470 from the target 410, as well as a direct reference signal from the base station 120 (similar to LOS reference signal 460 in FIG. 4) to determine a respective determine $R_{sum}$ using equation (3). (To reduce clutter, direct reference signals are not illustrated in FIG. 10.) Because $R_{sum}$ is the sum of $R_T$ and the respective $R_R$ for each UE 105, the value of $R_{sum}$ can be used to form a respective ellipse 480 for each UE 105, in which the base station 120 and UE 105 are foci of the respective ellipse. (Again, to reduce clutter, only applicable portions of ellipses 480 are illustrated in FIG. 10) The device determining the location of the target 410 (e.g., any/all of the UEs 105 and/or the location server 160 (not illustrated in FIG. 10)) may do so by determining the point at which the ellipses 480 converge. As such, no AoA or other angular determinations may be needed to determine the location of the target 410.

The number of UEs 105 used to determine the position of the target 410 in this manner may vary, depending on the situation. A larger or smaller number of UEs 105 than illustrated in FIG. 10, for example, can be used. In some circumstances, such as when two UEs 105 are used, there may be ambiguities (e.g., multiple convergence points) in the position of the target 410. In such instances, other data can be leveraged to resolve the ambiguities. This other data can include, for example, tracking information for the target 410, other (previous and/or simultaneous) position determinations for the target 410, or the like.

It can be noted that embodiments for determining the location of the target 410 in the manner illustrated in FIG. 10 may follow a similar process as those illustrated in FIGS. 8-9. Because multiple UEs 105 are used, the functionality of the UE 105 illustrated in FIGS. 8-9 may be replicated for all UEs 105. That said, the determination of the position of the target at block 860 of FIG. 8 may be performed by a single UE 105, if desired. To do so, the UE 105 may perform multilateration calculations based on positioning information (e.g., ToA measurements and/or time-difference determinations) received from the other UEs. This information may be received directly from the other UEs (e.g., using sidelink communications) or indirectly via the location server 160 and/or base station 120.

Figure 11:
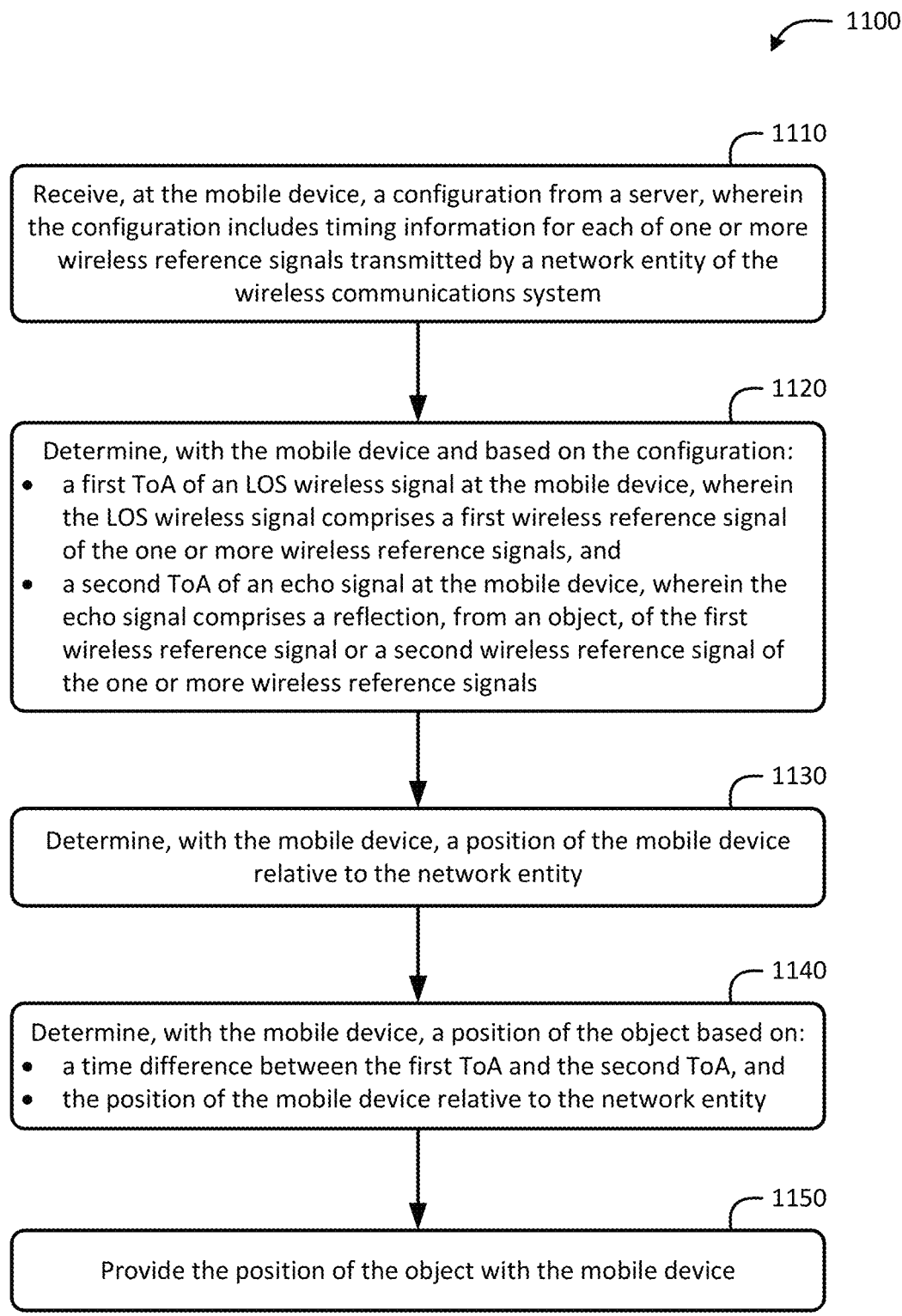
FIGS. 11-13 are a flow diagrams of methods of performing RF sensing, according to some embodiments.
Figure 14:
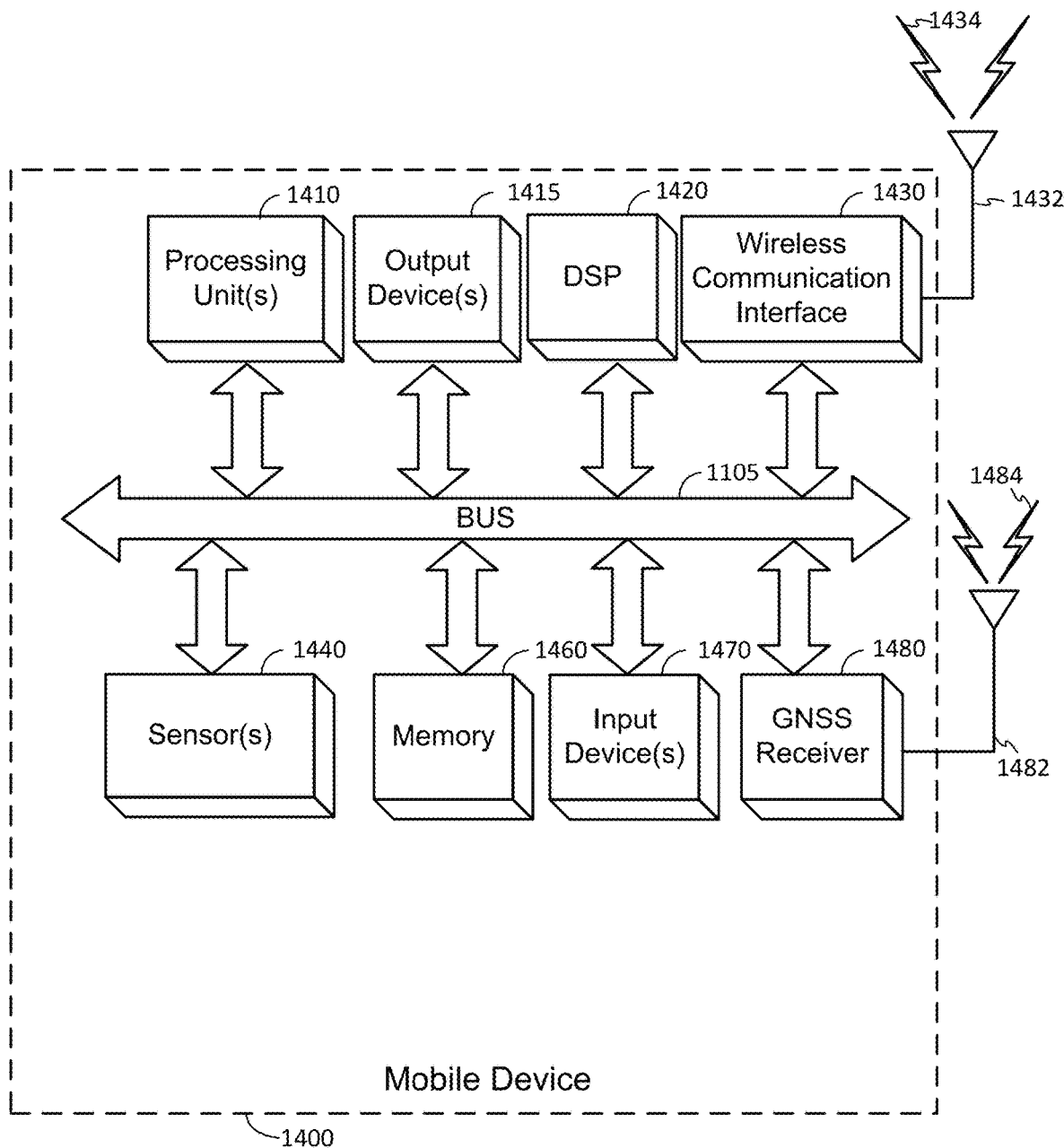
FIG. 14 is a block diagram of an embodiment of a mobile device, which can be utilized in embodiments as described herein.

FIG. 11 is a flow diagram of a method 1100 of performing RF sensing with a mobile device in a wireless communication network, according to an embodiment. Here, the mobile device may correspond with the UE 105, as described in FIGS. 4-10. Further, the position of the object is determined by the mobile device. And thus, the method 1100 may be similar to the functionality of the UE 105 as illustrated in FIG. 8 and described above. Means for performing the functionality illustrated in one or more of the blocks shown in FIG. 11 may be performed by hardware and/or software components of a UE 105. Example components of a UE 105 are illustrated in FIG. 14 and described in more detail below.

At block 1110, the functionality comprises receiving, at the mobile device, a configuration from a server, wherein the configuration includes timing information for each of one or more wireless reference signals transmitted by a network entity of the wireless communications network. As noted in the previously-described embodiments, a UE 105 may be configured to measure one or more reference signals. This configuration may be received by the location server. Further, as indicated in the above-described embodiments, the network entity may comprise a base station. More broadly, the network entity may comprise any type of base station or TRP (including a gNB or eNB, for example). In some embodiments, a network entity may alternatively comprise another UE having a known location and capable of performing the operations of a base station as indicated in the previously-described embodiments. Where the network entity comprises a base station or TRP, the wireless reference signals may comprise a downlink (DL) reference signal such as a PRS, SSB, Tracking Reference Signal (TRS), Channel State Information Reference Signal (CSIRS), Demodulation Reference Signal (DMRS), etc. Where the network entity comprises another UE, the wireless reference signal may comprise a sidelink (SL) reference signal, such as an SL-PRS, DMRS, CSIRS, etc.

As indicated in the embodiments above, the configuration itself may include various types of information regarding the one or more wireless reference signals. Thus, according to some embodiments of the method 1100, for each of the one or more wireless reference signals, the configuration may comprise a signal type of the respective wireless reference signal, a duration of the respective wireless reference signal, a center frequency and bandwidth of the respective wireless reference signal, or a period and prepetition factor of the respective wireless reference signal, or any combination thereof. Additionally or alternatively, for each of the one or more wireless reference signals, the timing information may comprise a time at which the respective reference signal is transmitted by the network entity, or a time at which the respective reference signal is expected to be received at the mobile device, or any combination thereof.

According to some embodiments, the operations illustrated in FIG. 11 may be performed in response to a request at the mobile device for the position of an object or target. As indicated with arrow 810 of FIG. 8, the mobile device can then respond by sending a position request to the location server 160. Accordingly, some embodiments of the method 1100 may comprise, prior to receiving the configuration from the server, sending a request to the server to perform the RF sensing.

Means for performing functionality at block 1110 may comprise a bus 1405, wireless communication interface 1430, digital signal processor (DSP) 1420, processing unit(s) 1410, memory 1460, and/or other components of a mobile device, as illustrated in FIG. 14.

At block 1120, the functionality comprises determining, with the mobile device and based on the configuration, (i) a first ToA of an LOS wireless signal at the mobile device, wherein the LOS wireless signal comprises a first wireless reference signal of the one or more wireless reference signals, and (ii) a second ToA of an echo signal at the mobile device, wherein the echo signal comprises a reflection, from an object, of the first wireless reference signal or a second wireless reference signal of the one or more wireless reference signals. An example time difference is provided in equation (3) as $T_{Rx\_echo} - T_{Rx_{LOS}}$. As noted, Doppler for the object, too, may be measured. Thus, according to some embodiments of the method 1100, the echo signal comprises a reflection of the first wireless reference signal from the object, and the mobile device further estimates Doppler from the echo signal.

As described in the embodiments above, if ToA measurements are of different wireless signals (e.g., the first wireless reference signal and the second wireless reference signal) transmitted at different times, a time delay (e.g., time gap $\Delta$) can be accounted for. Thus, according to some embodiments of the method 1100, the echo signal comprises a reflection of the second wireless reference signal from the object, and determining the position of the object may be further based on a difference between a time the network entity transmits the first wireless reference signal and a time the network entity transmits the second reference signal. In some embodiments, determining the difference between the time the network entity transmits the first wireless reference signal and the time the network entity transmits the second reference signal based on the timing information in the configuration.

Means for performing functionality at block 1120 may comprise a bus 1405, wireless communication interface 1430, digital signal processor (DSP) 1420, processing unit 1410, memory 1460, and/or other components of a mobile device, as illustrated in FIG. 14.

At block 1130, the functionality comprises determining, with the mobile device, a position of the mobile device relative to the network entity. As illustrated in the embodiments above, a distance L between the mobile device and network entity can be used to determine $R_{sum}$ and ultimately $R_R$. According to some embodiments, this distance may be determined by a location server or mobile device and may be derived from determined positions of the network entity and mobile device. For immobile network entities (e.g., base stations), an almanac or index of such network entities may be accessed and/or maintained by the location server, and further may be provided to the mobile device. Such embodiments may comprise receiving a location of the network entity from the server, wherein determining the position of the mobile device relative to the network entity is based, at least in part, on the location of the network entity. In some embodiments, the first wireless reference signal may be used not only to determine the position of the object, but also the position of the mobile device. For example, in some embodiments the first wireless reference signal may comprise a PRS. In such embodiments, this PRS may further be used in network-based positioning of the mobile device. A such, in some embodiments of the method 1100, determining the position of the mobile device relative to the network entity is based, at least in part, on the PRS.

Means for performing functionality at block 1130 may comprise a bus 1405, wireless communication interface 1430, digital signal processor (DSP) 1420, processing unit 1410, memory 1460, and/or other components of a mobile device, as illustrated in FIG. 14.

At block 1140, the functionality comprises determining with the mobile device, a position of the object based on (i) a time difference between the first ToA and the second ToA, and (ii) the position of the mobile device relative to the network entity. Again, the time difference and position of the mobile device relative to the network entity can be used to solve for equations (2) and (3). As noted, according to some embodiments, and AoA measurement at the mobile device may be used to determine angle $\theta_R$ of equation (2). Alternatively, as indicated in FIG. 10, the mobile device may be one of multiple mobile devices making ToA measurements of the one or more wireless reference signals. In such instances, $R_{sum}$ can be determined (e.g., using equation (3)) for each mobile device, and the position of the object can be determined using multilateration (e.g., by identifying a point at which ellipses derived from each $R_{sum}$ converge with one another.)

Means for performing functionality at block 1140 may comprise a bus 1405, wireless communication interface 1430, digital signal processor (DSP) 1420, processing unit 1410, memory 1460, and/or other components of a mobile device, as illustrated in FIG. 14.

At block 1150, the functionality comprises providing the position of the object with the mobile device. As previously noted, the way in which the position is provided can vary depending on circumstance. According to some embodiments, the determination of the position of the object may be carried out using a specialized application or lower-level function, in which case providing the position of the object may comprise providing the position of the object to an application executed by the mobile device.

Means for performing functionality at block 1150 may comprise a bus 1405, wireless communication interface 1430, digital signal processor (DSP) 1420, processing unit 1410, memory 1460, and/or other components of a mobile device, as illustrated in FIG. 14.

Figure 12:
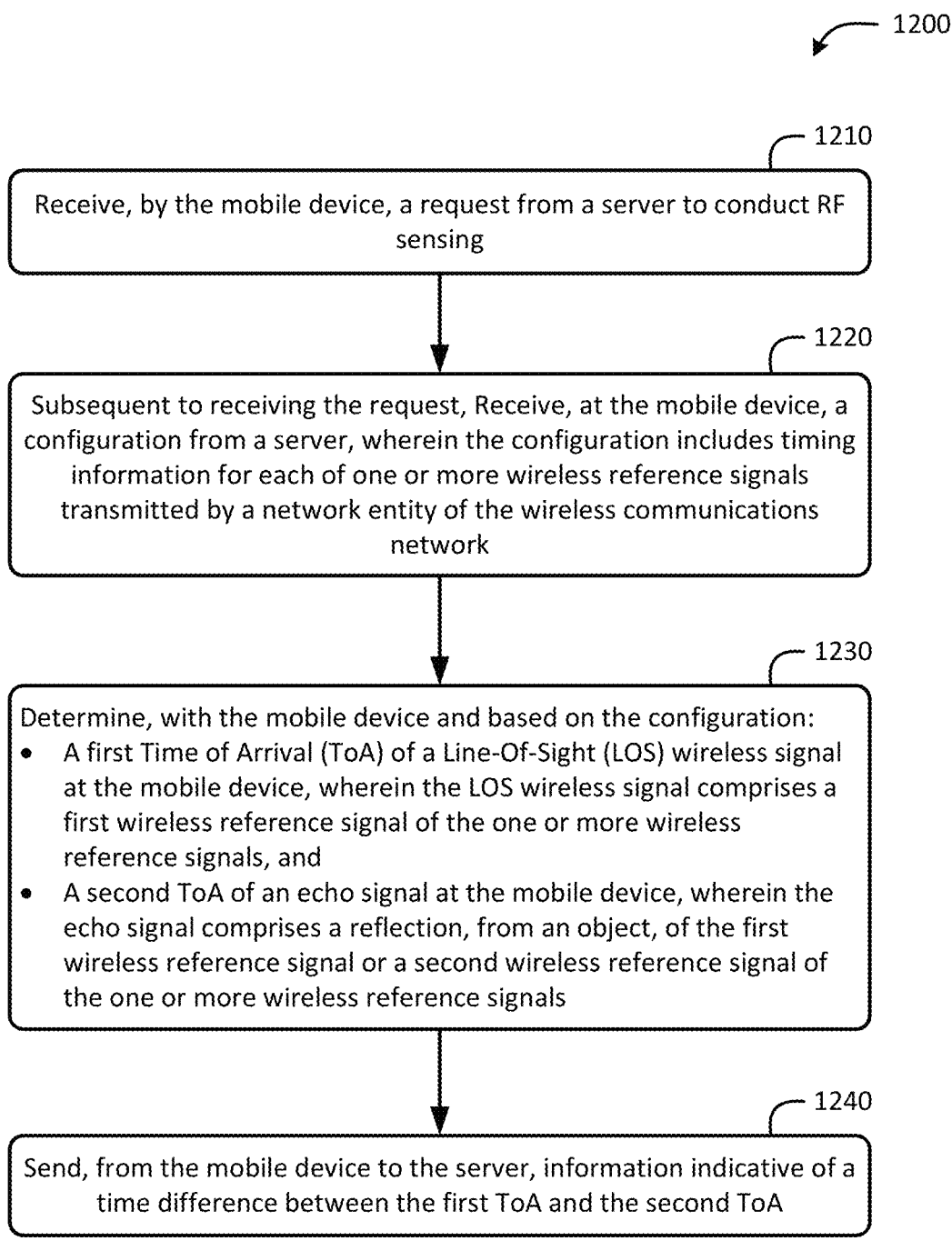

FIG. 12 is a flow diagram of another method 1200 of performing RF sensing with a mobile device in a wireless communication network, according to an embodiment. Again, the mobile device may correspond with the UE 105, as described in FIGS. 4-10. Here, however, the method 1200 may be similar to the functionality of the UE 105 as illustrated in FIG. 9 and described above, in which the position of the object may be determined by a server. Means for performing the functionality illustrated in one or more of the blocks shown in FIG. 12 may be performed by hardware and/or software components of a UE 105. Example components of a UE 105 are illustrated in FIG. 14 and described in more detail below.

At block 1210, the functionality comprises receiving, by the mobile device, a request from a server to conduct RF sensing. As discussed above in relation to FIG. 9, a location server may receive a position request (e.g., from within the wireless communication network or from an external entity) for an object/target and, in turn, send a position request notification to the mobile device to conduct RF sensing as described herein. Other triggers and sources for the position request may exist. Embodiments are not limited to the positioning of an object, for example, and requests for RF sensing in the manner described herein may be requests for other types of information (e.g., object detection, identification, movement/object tracking, etc.). The positioning request notification, according to some embodiments, may be part of a larger positioning or communication session between the server and mobile device. Means for performing functionality at block 1210 may comprise a bus 1405, wireless communication interface 1430, digital signal processor (DSP) 1420, processing unit 1410, memory 1460, and/or other components of a mobile device, as illustrated in FIG. 14.

At block 1220, the functionality comprises, subsequent to receiving the request, receiving, at the mobile device, a configuration from a server, wherein the configuration includes timing information for each of one or more wireless reference signals transmitted by a network entity of the wireless communications network. Similar to the functionality of block 1110 in FIG. 11, the configuration at block 1220 may enable the mobile device to measure one or more reference signals transmitted by a network entity. Again, according to some embodiments, for each of the one or more wireless reference signals, the configuration may comprise a signal type of the respective wireless reference signal, a duration of the respective wireless reference signal, a center frequency and bandwidth of the respective wireless reference signal, or a period and prepetition factor of the respective wireless reference signal, or any combination thereof. Additionally or alternatively, for each of the one or more wireless reference signals, the timing information may comprise a time at which the respective reference signal is transmitted by the network entity, or a time at which the respective reference signal is expected to be received at the mobile device, or any combination thereof. Means for performing functionality at block 1220 may comprise a bus 1405, wireless communication interface 1430, digital signal processor (DSP) 1420, processing unit 1410, memory 1460, and/or other components of a mobile device, as illustrated in FIG. 14.

At block 1230, the functionality comprises determining, with the mobile device and based on the configuration, (i) a first Time of Arrival (ToA) of a Line-Of-Sight (LOS) wireless signal at the mobile device, wherein the LOS wireless signal comprises a first wireless reference signal of the one or more wireless reference signals, and (ii) a second ToA of an echo signal at the mobile device, wherein the echo signal comprises a reflection, from an object, of the first wireless reference signal or a second wireless reference signal of the one or more wireless reference signals. As noted, a determined time difference between these ToAs can be used can be used to determine $R_{sum}$ and ultimately the location of the object. According to some embodiments, the first wireless reference signal comprises a PRS (e.g., DL-PRS transmitted by a base station). Means for performing functionality at block 1230 may comprise a bus 1405, wireless communication interface 1430, digital signal processor (DSP) 1420, processing unit 1410, memory 1460, and/or other components of a mobile device, as illustrated in FIG. 14.

At block 1240, the functionality comprises sending, from the mobile device to the server, information indicative of a time difference between the first ToA and the second ToA. According to some embodiments, the information provided by the mobile device at block 1240 may vary. For example, according to some embodiments, the method 1200 may further comprise determining a position of the mobile device and sending information indicative of the position of the mobile device to the server. Additionally or alternatively, in embodiments in which the echo signal comprises a reflection of the first wireless reference signal from the object, and the method 1200 may further comprise estimating, with the mobile device, Doppler from the echo signal and sending the estimated Doppler from the mobile device to the server.

Means for performing functionality at block 1240 may comprise a bus 1405, wireless communication interface 1430, digital signal processor (DSP) 1420, processing unit 1410, memory 1460, and/or other components of a mobile device, as illustrated in FIG. 14.

Figure 13:
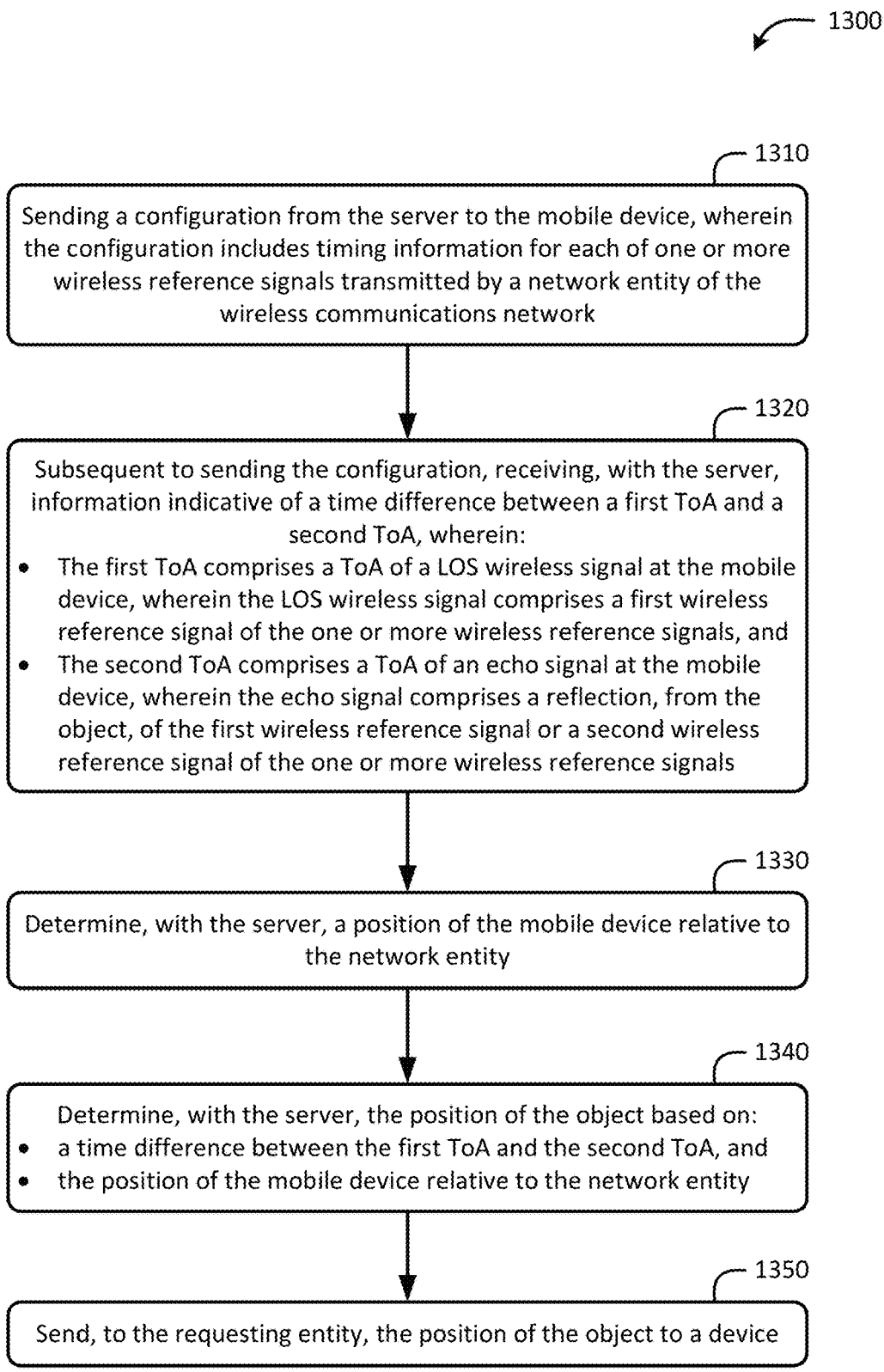

FIG. 13 is a flow diagram of method 1300 of performing RF sensing in a wireless communication network, according to an embodiment. Again, the mobile device may correspond with the UE 105, as described in FIGS. 4-10. The method 1300 may be similar to the functionality of the location server 160 as illustrated in FIG. 9 and described above, in which the position of the object may be determined by the location server. Means for performing the functionality illustrated in one or more of the blocks shown in FIG. 13 may be performed by hardware and/or software components of a computer system. Example components of a computer system are illustrated in FIG. 15 and described in more detail below.

At block 1310, the functionality comprises sending a configuration from the server to the mobile device, wherein the configuration includes timing information for each of one or more wireless reference signals transmitted by a network entity of the wireless communications network. Similar to the configuration described in the methods shown in FIGS. 11-12, the configuration at block 1310 may enable the mobile device to measure one or more reference signals transmitted by a network entity. Again, according to some embodiments, for each of the one or more wireless reference signals, the configuration may comprise a signal type of the respective wireless reference signal, a duration of the respective wireless reference signal, a center frequency and bandwidth of the respective wireless reference signal, or a period and prepetition factor of the respective wireless reference signal, or any combination thereof. Additionally or alternatively, for each of the one or more wireless reference signals, the timing information may comprise a time at which the respective reference signal is transmitted by the network entity, or a time at which the respective reference signal is expected to be received at the mobile device, or any combination thereof.

Figure 15:
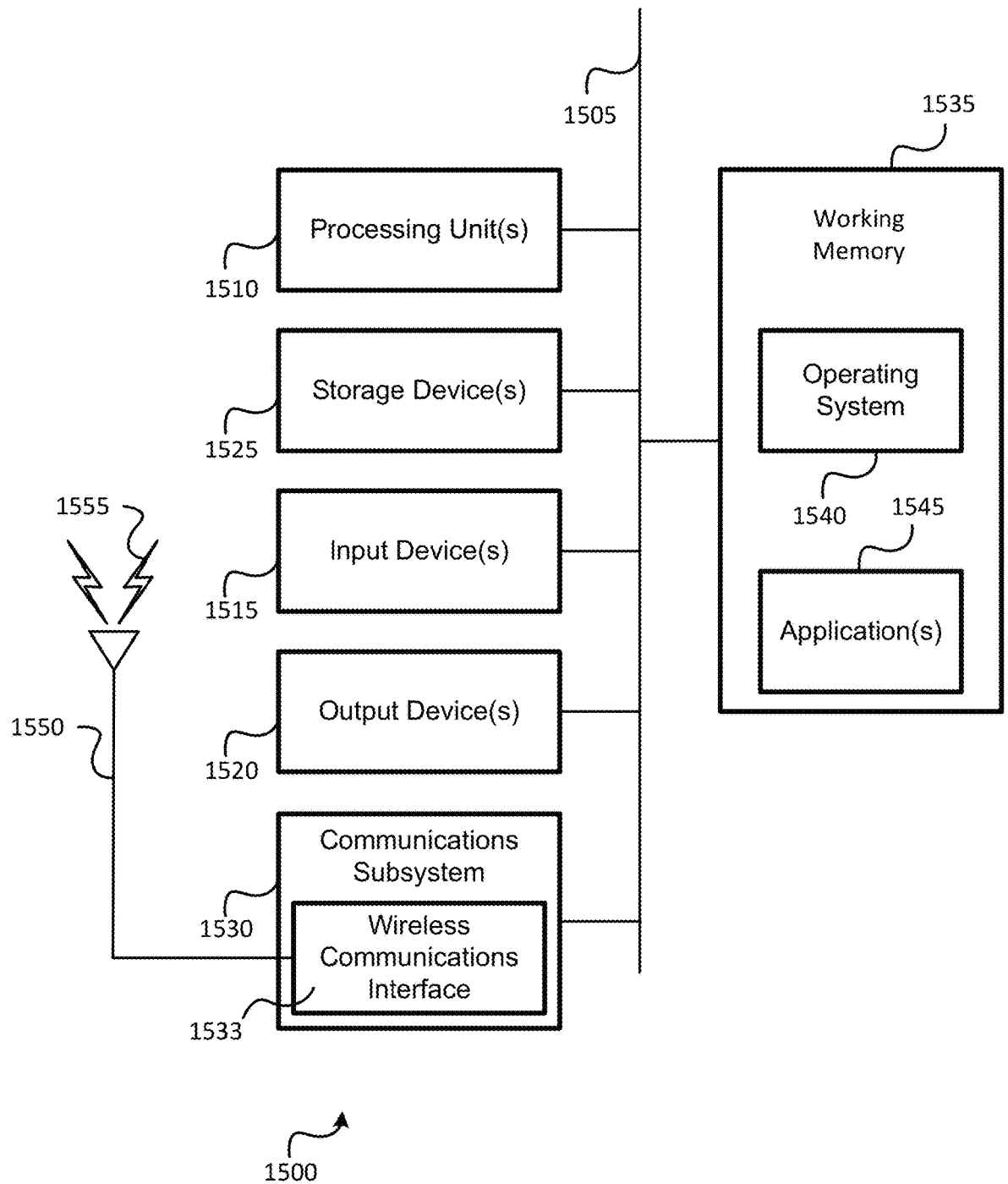
FIG. 15 is a block diagram of an embodiment of a computer system, which can be utilized in embodiments as described herein.

Means for performing functionality at block 1310 may comprise a bus 1505, communication interface 1530, processing unit(s) 1510, working memory 1535, and/or other components of a computer system, as illustrated in FIG. 15.

At block 1320, the functionality comprises, subsequent to sending the configuration, receiving, with the server, information indicative of a time difference between a first ToA and a second ToA, wherein the first ToA comprises a ToA of a Line-Of-Sight (LOS) wireless signal at the mobile device, wherein the LOS wireless signal comprises a first wireless reference signal of the one or more wireless reference signals, and the second ToA comprises a ToA of an echo signal at the mobile device, wherein the echo signal comprises a reflection, from the object, of the first wireless reference signal or a second wireless reference signal of the one or more wireless reference signals. Again, this time difference between ToAs can be used can be used to determine $R_{sum}$ and ultimately the location of the object. According to some embodiments, the first wireless reference signal comprises a PRS (e.g., DL-PRS transmitted by a base station). As noted, Doppler may also be sent from the mobile device to the server. In such embodiments, the echo signal may comprise a reflection of the first wireless reference signal from the object and the method 1300 may further comprise receiving, at the server, an estimated Doppler from the mobile device.

Means for performing functionality at block 1320 may comprise a bus 1505, communication interface 1530, processing unit(s) 1510, working memory 1535, and/or other components of a computer system, as illustrated in FIG. 15.

At block 1330, the functionality comprises determining, with the server, a position of the mobile device relative to the network entity. As described in the embodiments above, the determination can be made based on a determination of the location of the mobile device itself (e.g., using network-based positioning of the mobile device, a GNSS position provided by the mobile device, etc.) and a location of the network entity. Again, an almanac or directory of the locations of network entities such as base stations and other TRPs may be accessible and/or maintained by the server. Means for performing functionality at block 1330 may comprise a bus 1505, processing unit(s) 1510, working memory 1535, and/or other components of a computer system, as illustrated in FIG. 15.

At block 1340, the functionality comprises determining, with the server, the position of the object based on (i) a time difference between the first ToA and the second ToA, and (ii) the position of the mobile device relative to the network entity. Again, the time difference and position of the mobile device relative to the network entity can be used to solve for equations (2) and (3). As noted, according to some embodiments, and AoA measurement at the mobile device may be used to determine angle $\theta_R$ of equation (2). Alternatively, as indicated in FIG. 10, the mobile device may be one of multiple mobile devices making ToA measurements of the one or more wireless reference signals. In such instances, $R_{sum}$ can be determined (e.g., using equation (3)) for each mobile device, and the position of the object can be determined using multilateration (e.g., by identifying a point at which ellipses derived from each $R_{sum}$ converge with one another.) In such embodiments, the server may therefore perform the operations of blocks 1310-1330 or multiple mobile devices, making the determination of the position of the object at block 1340 based on information received from the mobile devices.

Means for performing functionality at block 1340 may comprise a bus 1505, communication interface 1530, processing unit(s) 1510, working memory 1535, and/or other components of a computer system, as illustrated in FIG. 15.

The functionality at block 1350 comprises sending, to the requesting entity, the position of the object to a device. As noted, the device may comprise a requesting entity internal or external to the mobile communication network. In such embodiments, the method 1300 may further comprise receiving, at a server, a request from a requesting entity for the position of an object, and responsive to receiving the request for the position of the object, sending a request from the server to the mobile device to conduct RF sensing. In such embodiments, sending the configuration may be subsequent to sending the request to the mobile device, and sending the position of the object to the device may comprise sending the position of the object to the requesting entity.

Means for performing functionality at block 1350 may comprise a bus 1505, communication interface 1530, processing unit(s) 1510, working memory 1535, and/or other components of a computer system, as illustrated in FIG. 15.

FIG. 14 illustrates an embodiment of a mobile device 1400, which can be utilized as a target, UE, or other UE as described herein above (e.g., in association with FIGS. 1-13). For example, the mobile device 1400 can perform one or more of the functions of the methods shown in FIGS. 11-12. It should be noted that FIG. 14 is meant only to provide a generalized illustration of various components, any or all of which may be utilized as appropriate. It can be noted that, in some instances, components illustrated by FIG. 14 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 14.

The mobile device 1400 is shown comprising hardware elements that can be electrically coupled via a bus 1405 (or may otherwise be in communication, as appropriate). The hardware elements may include a processing unit(s) 1410 which can include without limitation one or more general-purpose processors, one or more special-purpose processors (such as DSP chips, graphics acceleration processors, application specific integrated circuits (ASICs), and/or the like), and/or other processing structures or means. As shown in FIG. 14, some embodiments may have a separate DSP 1420, depending on desired functionality. Location determination and/or other determinations based on wireless communication may be provided in the processing unit(s) 1410 and/or wireless communication interface 1430 (discussed below). The mobile device 1400 also can include one or more input devices 1470, which can include without limitation one or more keyboards, touch screens, touch pads, microphones, buttons, dials, switches, and/or the like; and one or more output devices 1415, which can include without limitation one or more displays (e.g., touch screens), light emitting diodes (LEDs), speakers, and/or the like.

The mobile device 1400 may also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1400 to communicate with other devices as described in the embodiments above. The wireless communication interface 1430 may permit data and signaling to be communicated (e.g., transmitted and received) with TRPs of a network, (e.g., including eNBs, gNBs, ng-eNBs), access points, various base stations and/or other access node types, and/or other network components, computer systems, and/or any other electronic devices (UEs/mobile devices, etc.) communicatively coupled with TRPs, as described herein. The communication can be carried out via one or more wireless communication antenna(s) 1432 that send and/or receive wireless signals 1434. According to some embodiments, the wireless communication antenna(s) 1432 may comprise a plurality of discrete antennas, antenna arrays, or any combination thereof.

Depending on desired functionality, the wireless communication interface 1430 may comprise a separate receiver and transmitter, or any combination of transceivers, transmitters, and/or receivers to communicate with TRPs (e.g., ng-eNBs and gNBs) and other terrestrial transceivers, such as wireless devices and access points. The mobile device 1400 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1400 can further include sensor(s) 1440. Sensors 1440 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 1400 may also include a Global Navigation Satellite System (GNSS) receiver 1480 capable of receiving signals 1484 from one or more GNSS satellites using an antenna 1482 (which could be the same as antenna 1432). Positioning based on GNSS signal measurement can be utilized to complement and/or incorporate the techniques described herein. The GNSS receiver 1480 can extract a position of the mobile device 1400, using conventional techniques, from GNSS satellites 140 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1480 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1480 is illustrated in FIG. 14 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1410, DSP 1420, and/or a processing unit within the wireless communication interface 1430 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1410 or DSP 1420.

The mobile device 1400 may further include and/or be in communication with a memory 1460. The memory 1460 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like.

Such storage devices may be configured to implement any appropriate data stores, including without limitation, various file systems, database structures, and/or the like.

The memory 1460 of the mobile device 1400 also can comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the mobile device 1400 (and/or processing unit(s) 1410 or DSP 1420 within mobile device 1400). In an aspect, then such code and/or instructions can be used to configure and/or adapt a general-purpose computer (or other device) to perform one or more operations in accordance with the described methods.

FIG. 15 is a block diagram of an embodiment of a computer system 1500, which may be used, in whole or in part, to provide the functions of one or more network components as described in the embodiments herein (e.g., location server 160 of FIGS. 1, 4, 8, and 9). It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include processing unit(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1515, which may comprise without limitation a mouse, a keyboard, a camera, a microphone, and/or the like; and one or more output devices 1520, which may comprise without limitation a display device, a printer, and/or the like.

The computer system 1500 may further include (and/or be in communication with) one or more non-transitory storage devices 1525, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1500 may also include a communications subsystem 1530, which may comprise wireless communication technologies managed and controlled by a wireless communication interface 1533, as well as wired technologies (such as Ethernet, coaxial communications, universal serial bus (USB), and the like). The wireless communication interface 1533 may send and receive wireless signals 1555 (e.g., signals according to 5G NR or LTE) via wireless antenna(s) 1550. Thus the communications subsystem 1530 may comprise a modem, a network card (wireless or wired), an infrared communication device, a wireless communication device, and/or a chipset, and/or the like, which may enable the computer system 1500 to communicate on any or all of the communication networks described herein to any device on the respective network, including a UE/mobile device, base stations and/or other TRPs, and/or any other electronic devices described herein. Hence, the communications subsystem 1530 may be used to receive and send data as described in the embodiments herein.

In many embodiments, the computer system 1500 will further comprise a working memory 1535, which may comprise a RAM or ROM device, as described above. Software elements, shown as being located within the working memory 1535, may comprise an operating system 1540, device drivers, executable libraries, and/or other code, such as one or more applications 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of performing radio frequency (RF) sensing with a mobile device in a wireless communications network, the method comprising receiving, at the mobile device, a configuration from a server, wherein the configuration includes timing information for each of one or more wireless reference signals transmitted by a network entity of the wireless communications network; determining, with the mobile device and based on the configuration: a first Time of Arrival (ToA) of a Line-Of-Sight (LOS) wireless signal at the mobile device, wherein the LOS wireless signal comprises a first wireless reference signal of the one or more wireless reference signals; and a second ToA of an echo signal at the mobile device, wherein the echo signal comprises a reflection, from an object, of the first wireless reference signal or a second wireless reference signal of the one or more wireless reference signals; determining, with the mobile device, a position of the mobile device relative to the network entity; determining, with the mobile device, a position of the object based on: a time difference between the first ToA and the second ToA, and the position of the mobile device relative to the network entity; and providing the position of the object with the mobile device.

Clause 2: The method of clause 1, wherein the first wireless reference signal comprises a Positioning Reference Signal (PRS).

Clause 3: The method of clause 2, wherein determining the position of the mobile device relative to the network entity is based, at least in part, on the PRS.

Clause 4: The method of any of clauses 1-3, wherein the echo signal comprises a reflection of the first wireless reference signal from the object, and wherein the mobile device further estimates Doppler from the echo signal.

Clause 5: The method of any of clauses 1-3, wherein the echo signal comprises a reflection of the second wireless reference signal from the object, wherein determining the position of the object is further based on a difference between a time the network entity transmits the first wireless reference signal and a time the network entity transmits the second wireless reference signal.

Clause 6: The method of clause 5, further comprising determining the difference between the time the network entity transmits the first wireless reference signal and the time the network entity transmits the second wireless reference signal based on the timing information in the configuration.

Clause 7: The method of any of clauses 1-6, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 8: The method of any of clauses 1-7, wherein, for each of the one or more wireless reference signals, the timing information comprises a time at which the respective reference signal is transmitted by the network entity, or a time at which the respective reference signal is expected to be received at the mobile device, or any combination thereof.

Clause 9: The method of any of clauses 1-8, further comprising receiving a location of the network entity from the server, wherein determining the position of the mobile device relative to the network entity is based, at least in part, on the location of the network entity.

Clause 10: The method of any of clauses 1-9, wherein providing the position of the object with the mobile device comprises providing the position of the object to an application executed by the mobile device.

Clause 11: The method of any of clauses 1-10, further comprising, prior to receiving the configuration from the server, sending a request to the server to perform the RF sensing.

Clause 12: A method of performing radio frequency (RF) sensing with a mobile device in a wireless communications network, the method comprising: receiving, by the mobile device, a request from a server to conduct RF sensing; subsequent to receiving the request, receiving, at the mobile device, a configuration from a server, wherein the configuration includes timing information for each of one or more wireless reference signals transmitted by a network entity of the wireless communications network; determining, with the mobile device and based on the configuration: a first Time of Arrival (ToA) of a Line-Of-Sight (LOS) wireless signal at the mobile device, wherein the LOS wireless signal comprises a first wireless reference signal of the one or more wireless reference signals; and a second ToA of an echo signal at the mobile device, wherein the echo signal comprises a reflection, from an object, of the first wireless reference signal or a second wireless reference signal of the one or more wireless reference signals; and sending, from the mobile device to the server, information indicative of a time difference between the first ToA and the second ToA.

Clause 13: The method of clause 12, wherein the first wireless reference signal comprises a Positioning Reference Signal (PRS).

Clause 14: The method of clauses 12 or 13, further comprising: determining a position of the mobile device; and sending information indicative of the position of the mobile device to the server.

Clause 15: The method of any of clauses 12-14, wherein the echo signal comprises a reflection of the first wireless reference signal from the object, and the method further comprises: estimating, with the mobile device, Doppler from the echo signal; and sending the estimated Doppler from the mobile device to the server.

Clause 16: The method of any of clauses 12-15, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 17: The method of any of clauses 12-16, wherein, for each of the one or more wireless reference signals, the timing information comprises: a time at which the respective reference signal is transmitted by the network entity, or a time at which the respective reference signal is expected to be received at the mobile device, or any combination thereof.

Clause 18: A method of performing radio frequency (RF) sensing of an object in a wireless communications network, the method comprising: sending a configuration from a server to a mobile device, wherein the configuration includes timing information for each of one or more wireless reference signals transmitted by a network entity of the wireless communications network; subsequent to sending the configuration, receiving, with the server, information indicative of a time difference between a first Time of Arrival (ToA) and a second ToA, wherein: the first ToA comprises a ToA of a Line-Of-Sight (LOS) wireless signal at the mobile device, wherein the LOS wireless signal comprises a first wireless reference signal of the one or more wireless reference signals; and the second ToA comprises a ToA of an echo signal at the mobile device, wherein the echo signal comprises a reflection, from the object, of the first wireless reference signal or a second wireless reference signal of the one or more wireless reference signals; determining, with the server, a position of the mobile device relative to the network entity; determining, with the server, the position of the object based on: a time difference between the first ToA and the second ToA, and the position of the mobile device relative to the network entity; and sending the position of the object to a device.

Clause 19: The method of clause 18, further comprising: receiving, at a server, a request from a requesting entity for the position of an object; and responsive to receiving the request for the position of the object, sending a request from the server to the mobile device to conduct RF sensing; wherein: sending the configuration is subsequent to sending the request to the mobile device; and sending the position of the object to the device comprises sending the position of the object to the requesting entity.

Clause 20: The method of clauses 18 or 19, wherein determining the position of the mobile device relative to the network entity comprises receiving, at the server, the position of the mobile device from the mobile device.

Clause 21: The method of any of clauses 18-20, wherein the echo signal comprises a reflection of the first wireless reference signal from the object, and the method further comprises: receiving, at the server, an estimated Doppler from the mobile device.

Clause 22: The method of any of clauses 18-21, wherein, for each of the one or more wireless reference signals, the configuration comprises: a signal type of the respective wireless reference signal, duration of the respective wireless reference signal, a center frequency and bandwidth of the respective wireless reference signal, or a period and prepetition factor of the respective wireless reference signal, or any combination thereof.

Clause 23: The method of any of clauses 18-22 wherein, for each of the one or more wireless reference signals, the timing information comprises: a time at which the respective reference signal is transmitted by the network entity, or a time at which the respective reference signal is expected to be received at the mobile device, or any combination thereof.

Clause 24: A mobile device comprising: a wireless communication interface; a memory; and one or more processing units communicatively coupled with the wireless communication interface and the memory and configured to: receive, via the wireless communication interface, a configuration from a server, wherein the configuration includes timing information for each of one or more wireless reference signals transmitted by a network entity of a wireless communications network; determine, based on the configuration: a first Time of Arrival (ToA) of a Line-Of-Sight (LOS) wireless signal at the mobile device, wherein the LOS wireless signal comprises a first wireless reference signal of the one or more wireless reference signals; and a second ToA of an echo signal at the mobile device, wherein the echo signal comprises a reflection, from an object, of the first wireless reference signal or a second wireless reference signal of the one or more wireless reference signals; determine a position of the mobile device relative to the network entity; determine a position of the object based on: a time difference between the first ToA and the second ToA, and the position of the mobile device relative to the network entity; and provide the position of the object with the mobile device.

Clause 25: The mobile device of clause 24, wherein the first wireless reference signal comprises a Positioning Reference Signal (PRS).

Clause 26: The mobile device of clause 25, wherein the one or more processing units are configured to determine the position of the mobile device relative to the network entity based, at least in part, on the PRS.

Clause 27: The mobile device of any of clauses 24-26, wherein the echo signal comprises a reflection of the first wireless reference signal from the object, and wherein the one or more processing units are configured to estimate Doppler from the echo signal.

Clause 28: The mobile device of any of clauses 24-26, wherein the echo signal comprises a reflection of the second wireless reference signal from the object, and wherein the one or more processing units are configured to determine the position of the object further based on a difference between a time the network entity transmits the first wireless reference signal and a time the network entity transmits the second wireless reference signal.

Clause 29: The mobile device of clause 28, wherein the one or more processing units are further configured to determine the difference between the time the network entity transmits the first wireless reference signal and the time the network entity transmits the second wireless reference signal based on the timing information in the configuration.

Clause 30: The mobile device of clause 24, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 31: The mobile device of any of clauses 24-30, wherein, for each of the one or more wireless reference signals, the timing information comprises: a time at which the respective reference signal is transmitted by the network entity, or a time at which the respective reference signal is expected to be received at the mobile device, or any combination thereof.

Clause 32: The mobile device of any of clauses 24-31, wherein the one or more processing units are further configured to receive a location of the network entity from the server, and wherein the one or more processing units are further configured to determine the position of the mobile device relative to the network entity based, at least in part, on the location of the network entity.

Clause 33: The mobile device of any of clauses 24-32, wherein, to provide the position of the object with the mobile device, the one or more processing units are further configured to provide the position of the object to an application executed by the mobile device.

Clause 34: The mobile device of any of clauses 24-33, wherein the one or more processing units are further configured to, prior to receiving the configuration from the server, send a request via the wireless communication interface to the server to perform RF sensing.

Clause 35: A mobile device comprising: a wireless communication interface; a memory; and one or more processing units communicatively coupled with the wireless communication interface and the memory and configured to: receive, via the wireless communication interface, a request from a server to conduct radio frequency (RF) sensing; receive, via the wireless communication interface and subsequent to receiving the request, a configuration from a server, wherein the configuration includes timing information for each of one or more wireless reference signals transmitted by a network entity of a wireless communications network; determine, based on the configuration: a first Time of Arrival (ToA) of a Line-Of-Sight (LOS) wireless signal at the mobile device, wherein the LOS wireless signal comprises a first wireless reference signal of the one or more wireless reference signals; and a second ToA of an echo signal at the mobile device, wherein the echo signal comprises a reflection, from an object, of the first wireless reference signal or a second wireless reference signal of the one or more wireless reference signals; and send, to the server via the wireless communication interface, information indicative of a time difference between the first ToA and the second ToA.

Clause 36: The mobile device of clause 35, wherein the first wireless reference signal comprises a Positioning Reference Signal (PRS).

Clause 37: The mobile device of clauses 35 or 36, wherein the one or more processing units are further configured to: determine a position of the mobile device; and send, via the wireless communication interface, information indicative of the position of the mobile device to the server.

Clause 38: The mobile device of any of clauses 35-37, wherein the echo signal comprises a reflection of the first wireless reference signal from the object, and the one or more processing units are further configured to: Estimate Doppler from the echo signal; and send, via the wireless communication interface the estimated Doppler from the mobile device to the server.

Clause 39: The mobile device of any of clauses 35-38, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 40: The mobile device of any of clauses 35-39, wherein, for each of the one or more wireless reference signals, the timing information comprises: a time at which the respective reference signal is transmitted by the network entity, or a time at which the respective reference signal is expected to be received at the mobile device, or any combination thereof.

Clause 41: A server comprising: a communication interface; a memory; and one or more processing units communicatively coupled with the communication interface and the memory, the one or more processing units configured to: send, via the communication interface, a configuration to a mobile device, wherein the configuration includes timing information for each of one or more wireless reference signals transmitted by a network entity of a wireless communications network; subsequent to sending the configuration, receive, via the communication interface, information indicative of a time difference between a first Time of Arrival (ToA) and a second ToA, wherein: the first ToA comprises a ToA of a Line-Of-Sight (LOS) wireless signal at the mobile device, wherein the LOS wireless signal comprises a first wireless reference signal of the one or more wireless reference signals; and the second ToA comprises a ToA of an echo signal at the mobile device, wherein the echo signal comprises a reflection, from an object, of the first wireless reference signal or a second wireless reference signal of the one or more wireless reference signals; determine a position of the mobile device relative to the network entity; determine the position of the object based on: a time difference between the first ToA and the second ToA, and the position of the mobile device relative to the network entity; and send, via the communication interface, the position of the object to a device.

Clause 42: The server of clause 41, wherein the one or more processing units are further configured to: receive, via the communication interface, a request from a requesting entity for the position of an object; and responsive to receiving the request for the position of the object, send a request via the communication interface to the mobile device to conduct RF sensing; wherein: the one or more processing units are configured to send the configuration subsequent to sending the request to the mobile device; and sending the position of the object to the device comprises sending the position of the object to the requesting entity.

Clause 43: The server of clauses 41 or 42, wherein, to determine the position of the mobile device relative to the network entity, the one or more processing units are configured to receive, via the communication interface, the position of the mobile device from the mobile device.

Clause 44: The server of any of clauses 41-43, wherein the echo signal comprises a reflection of the first wireless reference signal from the object, and the one or more processing units are further configured to: receive, via the communication interface, an estimated Doppler from the mobile device.

Clause 45: The server of clauses 41-44, wherein the one or more processing units are further configured to include in the configuration, for each of the one or more wireless reference signals: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 46: The server of clauses 41-45, wherein the one or more processing units are further configured to include in the timing information of the configuration, for each of the one or more wireless reference signals: a time at which the respective reference signal is transmitted by the network entity, or a time at which the respective reference signal is expected to be received at the mobile device, or any combination thereof.

Clause 47: A device comprising: means for receiving a configuration from a server, wherein the configuration includes timing information for each of one or more wireless reference signals transmitted by a network entity of a wireless communications network; means for determining, based on the configuration: a first Time of Arrival (ToA) of a Line-Of-Sight (LOS) wireless signal at the device, wherein the LOS wireless signal comprises a first wireless reference signal of the one or more wireless reference signals; and a second ToA of an echo signal at the device, wherein the echo signal comprises a reflection, from an object, of the first wireless reference signal or a second wireless reference signal of the one or more wireless reference signals; means for determining a position of the device relative to the network entity; means for determining a position of the object based on: a time difference between the first ToA and the second ToA, and the position of the device relative to the network entity; and means for providing the position of the object with the device.

Clause 48: The device of clause 47, wherein the first wireless reference signal comprises a Positioning Reference Signal (PRS).

Clause 49: The device of clause 48, wherein determining the position of the device relative to the network entity is based, at least in part, on the PRS.

Clause 50: The device of any of clauses 47-49, wherein the echo signal comprises a reflection of the first wireless reference signal from the object, and wherein the device further comprises means for estimating Doppler from the echo signal.

Clause 51: The device of any of clauses 47-49, wherein the echo signal comprises a reflection of the second wireless reference signal from the object, further comprising means for basing the determination of the position of the object on a difference between a time the network entity transmits the first wireless reference signal and a time the network entity transmits the second wireless reference signal.

Clause 52: The device of clause 51, further comprising means for determining the difference between the time the network entity transmits the first wireless reference signal and the time the network entity transmits the second wireless reference signal based on the timing information in the configuration.

Clause 53: The device of clause 47, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 54: The device of any of clauses 47-53, wherein, for each of the one or more wireless reference signals, the timing information comprises: a time at which the respective reference signal is transmitted by the network entity, or a time at which the respective reference signal is expected to be received at the device, or any combination thereof.

Clause 55: The device of clauses 47-54, further comprising means for receiving a location of the network entity from the server, further comprising means for basing the determination of the position of the device relative to the network entity, at least in part, on the location of the network entity.

Clause 56: The device of clauses 47-55, wherein the means for providing the position of the object with the device comprises means for providing the position of the object to an application executed by the device.

Clause 57: The device of clauses 47-56, further comprising means for sending, prior to receiving the configuration from the server, a request to the server to perform RF sensing.

Clause 58: A device comprising: means for receiving a request from a server to conduct radio frequency (RF) sensing; means for receiving, subsequent to receiving the request, a configuration from a server, wherein the configuration includes timing information for each of one or more wireless reference signals transmitted by a network entity of a wireless communications network; means for determining, with the device and based on the configuration: a first Time of Arrival (ToA) of a Line-Of-Sight (LOS) wireless signal at the device, wherein the LOS wireless signal comprises a first wireless reference signal of the one or more wireless reference signals; and a second ToA of an echo signal at the device, wherein the echo signal comprises a reflection, from an object, of the first wireless reference signal or a second wireless reference signal of the one or more wireless reference signals; and means for sending, from the device to the server, information indicative of a time difference between the first ToA and the second ToA.

Clause 59: The device of clause 58, wherein the first wireless reference signal comprises a Positioning Reference Signal (PRS).

Clause 60: The device of clauses 58 or 59, further comprising: means for determining a position of the device; and means for sending information indicative of the position of the device to the server.

Clause 61: The device of any of clauses 58-60, wherein the echo signal comprises a reflection of the first wireless reference signal from the object, the device further comprising: means for estimating, with the device, Doppler from the echo signal; and means for sending the estimated Doppler from the device to the server.

Clause 62: The device of any of clauses 58-61, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 63: The device of any of clauses 58-62, wherein, for each of the one or more wireless reference signals, the timing information comprises: a time at which the respective reference signal is transmitted by the network entity, or a time at which the respective reference signal is expected to be received at the device, or any combination thereof.

Clause 64: A device comprising: means for sending a configuration from a device to a mobile device, wherein the configuration includes timing information for each of one or more wireless reference signals transmitted by a network entity of a wireless communications network; means for receiving, subsequent to sending the configuration, information indicative of a time difference between a first Time of Arrival (ToA) and a second ToA, wherein: the first ToA comprises a ToA of a Line-Of-Sight (LOS) wireless signal at the mobile device, wherein the LOS wireless signal comprises a first wireless reference signal of the one or more wireless reference signals; and the second ToA comprises a ToA of an echo signal at the mobile device, wherein the echo signal comprises a reflection, from an object, of the first wireless reference signal or a second wireless reference signal of the one or more wireless reference signals; means for determining a position of the mobile device relative to the network entity; means for determining the position of the object based on: a time difference between the first ToA and the second ToA, and the position of the mobile device relative to the network entity; and means for sending the position of the object to a device.

Clause 65: The device of clause 64, further comprising: means for receiving a request from a requesting entity for the position of an object; and means for sending, responsive to receiving the request for the position of the object, a request from the device to the mobile device to conduct RF sensing; wherein: sending the configuration is subsequent to sending the request to the mobile device; and sending the position of the object to the device comprises sending the position of the object to the requesting entity.

Clause 66: The device of clauses 64 or 65, wherein the means for determining the position of the mobile device relative to the network entity comprises means for receiving the position of the mobile device from the mobile device.

Clause 67: The device of any of clauses 64-66, wherein the echo signal comprises a reflection of the first wireless reference signal from the object, and the device further comprises: means for receiving, at the device, an estimated Doppler from the mobile device.

Clause 68: The device of any of clauses 64-67, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 69: The device of any of clauses 64-68, wherein, for each of the one or more wireless reference signals, the timing information comprises: a time at which the respective reference signal is transmitted by the network entity, or a time at which the respective reference signal is expected to be received at the mobile device, or any combination thereof.

Clause 70: A non-transitory computer-readable medium storing instructions for performing radio frequency (RF) sensing with a mobile device in a wireless communications network, the instructions comprising code for: Receiving a configuration from a server, wherein the configuration includes timing information for each of one or more wireless reference signals transmitted by a network entity of the wireless communications network; determining, based on the configuration: a first Time of Arrival (ToA) of a Line-Of-Sight (LOS) wireless signal at the mobile device, wherein the LOS wireless signal comprises a first wireless reference signal of the one or more wireless reference signals; and a second ToA of an echo signal at the mobile device, wherein the echo signal comprises a reflection, from an object, of the first wireless reference signal or a second wireless reference signal of the one or more wireless reference signals determining a position of the mobile device relative to the network entity; determining a position of the object based on: a time difference between the first ToA and the second ToA, and the position of the mobile device relative to the network entity; and providing the position of the object with the mobile device.

Clause 71: The non-transitory computer-readable medium of clause 70, wherein the first wireless reference signal comprises a Positioning Reference Signal (PRS).

Clause 72: The non-transitory computer-readable medium of clause 71, wherein determining the position of the mobile device relative to the network entity is based, at least in part, on the PRS.

Clause 73: The non-transitory computer-readable medium of any of clauses 70-72, wherein the echo signal comprises a reflection of the first wireless reference signal from the object, the instructions further comprising code for estimating Doppler from the echo signal.

Clause 74: The non-transitory computer-readable medium of any of clauses 70-72, wherein the echo signal comprises a reflection of the second wireless reference signal from the object, wherein determining the position of the object is further based on a difference between a time the network entity transmits the first wireless reference signal and a time the network entity transmits the second wireless reference signal.

Clause 75: The non-transitory computer-readable medium of clause 74, the instructions further comprising code for determining the difference between the time the network entity transmits the first wireless reference signal and the time the network entity transmits the second wireless reference signal based on the timing information in the configuration.

Clause 76: The non-transitory computer-readable medium of any of clauses 70-75, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 77: The non-transitory computer-readable medium of any of clauses 70-76, wherein, for each of the one or more wireless reference signals, the timing information comprises: a time at which the respective reference signal is transmitted by the network entity, or a time at which the respective reference signal is expected to be received at the mobile device, or any combination thereof.

Clause 78: The non-transitory computer-readable medium of any of clauses 70-77, the instructions further comprising code for receiving a location of the network entity from the server, wherein determining the position of the mobile device relative to the network entity is based, at least in part, on the location of the network entity.

Clause 79: The non-transitory computer-readable medium of any of clauses 70-78, wherein the code for providing the position of the object with the mobile device comprises code for providing the position of the object to an application executed by the mobile device.

Clause 80: The non-transitory computer-readable medium of any of clauses 70-79, the instructions further comprising code for sending, prior to receiving the configuration from the server, a request to the server to perform the RF sensing.

Clause 81: A non-transitory computer-readable medium storing instructions for performing radio frequency (RF) sensing with a mobile device in a wireless communications network, the instructions comprising code for: receiving, by the mobile device, a request from a server to conduct RF sensing; subsequent to receiving the request, receiving, at the mobile device, a configuration from a server, wherein the configuration includes timing information for each of one or more wireless reference signals transmitted by a network entity of the wireless communications network; determining, based on the configuration: a first Time of Arrival (ToA) of a Line-Of-Sight (LOS) wireless signal at the mobile device, wherein the LOS wireless signal comprises a first wireless reference signal of the one or more wireless reference signals; and a second ToA of an echo signal at the mobile device, wherein the echo signal comprises a reflection, from an object, of the first wireless reference signal or a second wireless reference signal of the one or more wireless reference signals; and sending, from the mobile device to the server, information indicative of a time difference between the first ToA and the second ToA.

Clause 82: The non-transitory computer-readable medium of clause 81, wherein the first wireless reference signal comprises a Positioning Reference Signal (PRS).

Clause 83: The non-transitory computer-readable medium of clauses 81 or 82, wherein the instructions further comprise code for: determining a position of the mobile device; and sending information indicative of the position of the mobile device to the server.

Clause 84: The non-transitory computer-readable medium of any of clauses 81-83, wherein the echo signal comprises a reflection of the first wireless reference signal from the object, and wherein the instructions further comprise code for: Estimating Doppler from the echo signal; and sending the estimated Doppler from the mobile device to the server.

Clause 85: The non-transitory computer-readable medium of any of clauses 81-84, wherein, for each of the one or more wireless reference signals, the configuration comprises: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 86: The non-transitory computer-readable medium of any of clauses 81-85, wherein, for each of the one or more wireless reference signals, the timing information comprises: a time at which the respective reference signal is transmitted by the network entity, or a time at which the respective reference signal is expected to be received at the mobile device, or any combination thereof.

Clause 87: A non-transitory computer-readable medium storing instructions for performing radio frequency (RF) sensing of an object in a wireless communications network, the instructions comprising code for: sending a configuration from a server to a mobile device, wherein the configuration includes timing information for each of one or more wireless reference signals transmitted by a network entity of the wireless communications network; subsequent to sending the configuration, receiving, with the server, information indicative of a time difference between a first Time of Arrival (ToA) and a second ToA, wherein: the first ToA comprises a ToA of a Line-Of-Sight (LOS) wireless signal at the mobile device, wherein the LOS wireless signal comprises a first wireless reference signal of the one or more wireless reference signals; and the second ToA comprises a ToA of an echo signal at the mobile device, wherein the echo signal comprises a reflection, from the object, of the first wireless reference signal or a second wireless reference signal of the one or more wireless reference signals; determining a position of the mobile device relative to the network entity; determining the position of the object based on: a time difference between the first ToA and the second ToA, and the position of the mobile device relative to the network entity; and sending the position of the object to a device.

Clause 88: The non-transitory computer-readable medium of clause 87, wherein the instructions further comprise code for: receiving a request from a requesting entity for the position of an object; and responsive to receiving the request for the position of the object, sending a request to the mobile device to conduct RF sensing; wherein: sending the configuration is subsequent to sending the request to the mobile device; and sending the position of the object to the device comprises sending the position of the object to the requesting entity.

Clause 89: The non-transitory computer-readable medium of clauses 87 or 88, wherein the code for determining the position of the mobile device relative to the network entity comprises code for receiving the position of the mobile device from the mobile device.

Clause 90: The non-transitory computer-readable medium of any of clauses 87-89, wherein the echo signal comprises a reflection of the first wireless reference signal from the object, and wherein the instructions further comprise code for: receiving, at the server, an estimated Doppler from the mobile device.

Clause 91: The non-transitory computer-readable medium of any of clauses 87-90, wherein the instructions further comprise code for including in the configuration, for each of the one or more wireless reference signals: a signal type of the respective wireless reference signal, a duration of the respective wireless reference signal, a center frequency and bandwidth of the respective wireless reference signal, or a period and prepetition factor of the respective wireless reference signal, or any combination thereof.

Clause 92: The non-transitory computer-readable medium of any of clauses 87-91, wherein the instructions further comprise code for including in the timing information of the configuration, for each of the one or more wireless reference signals: a time at which the respective reference signal is transmitted by the network entity, or a time at which the respective reference signal is expected to be received at the mobile device, or any combination thereof.

What is claimed is:

1. A method of performing radio frequency (RF) sensing with a mobile device in a wireless communications network, the method comprising:
  receiving, at the mobile device, a configuration from a server, wherein the configuration includes timing information for each of one or more wireless reference signals transmitted by a network entity of the wireless communications network;
  determining, with the mobile device and based on the configuration:
    a first Time of Arrival (ToA) of a Line-Of-Sight (LOS) wireless signal at the mobile device, wherein the LOS wireless signal comprises a first wireless reference signal of the one or more wireless reference signals; and
    a second ToA of an echo signal at the mobile device, wherein the echo signal comprises a reflection, from an object, of a second wireless reference signal of the one or more wireless reference signals;
  determining, with the mobile device, a position of the mobile device relative to the network entity;
  determining, with the mobile device, a position of the object based on:
    a time difference between the first ToA and the second ToA,
    a difference between a time the network entity transmits the first wireless reference signal and a time the network entity transmits the second wireless reference signal, and
    the position of the mobile device relative to the network entity; and
  providing the position of the object with the mobile device.

2. The method of claim 1, wherein the first wireless reference signal comprises a Positioning Reference Signal (PRS).

3. The method of claim 2, wherein determining the position of the mobile device relative to the network entity is based, at least in part, on the PRS.

4. The method of claim 1, further comprising determining the difference between the time the network entity transmits the first wireless reference signal and the time the network entity transmits the second wireless reference signal based on the timing information in the configuration.

5. The method of claim 1, wherein, for each of the one or more wireless reference signals, the configuration comprises:
  a signal type of the respective wireless reference signal,
  a duration of the respective wireless reference signal,
  a center frequency and bandwidth of the respective wireless reference signal, or
  a period and prepetition factor of the respective wireless reference signal, or
  any combination thereof.

6. The method of claim 1, wherein, for each of the one or more wireless reference signals, the timing information comprises:
  a time at which the respective reference signal is transmitted by the network entity, or
  a time at which the respective reference signal is expected to be received at the mobile device, or
  any combination thereof.

7. The method of claim 1, further comprising receiving a location of the network entity from the server, wherein determining the position of the mobile device relative to the network entity is based, at least in part, on the location of the network entity.

8. The method of claim 1, wherein providing the position of the object with the mobile device comprises providing the position of the object to an application executed by the mobile device.

9. The method of claim 1, further comprising, prior to receiving the configuration from the server, sending a request to the server to perform the RF sensing.

10. A mobile device comprising:
  a wireless communication interface;
  a memory; and
  one or more processing units communicatively coupled with the wireless communication interface and the memory and configured to:
    receive, via the wireless communication interface, a configuration from a server, wherein the configuration includes timing information for each of one or more wireless reference signals transmitted by a network entity of a wireless communications network;
    determine, based on the configuration:
      a first Time of Arrival (ToA) of a Line-Of-Sight (LOS) wireless signal at the mobile device, wherein the LOS wireless signal comprises a first wireless reference signal of the one or more wireless reference signals; and
      a second ToA of an echo signal at the mobile device, wherein the echo signal comprises a reflection, from an object, of a second wireless reference signal of the one or more wireless reference signals;

determine a position of the mobile device relative to the network entity;
determine a position of the object based on:
a time difference between the first ToA and the second ToA,
a difference between a time the network entity transmits the first wireless reference signal and a time the network entity transmits the second wireless reference signal, and
the position of the mobile device relative to the network entity; and
provide the position of the object with the mobile device.

11. The mobile device of claim 10, wherein the first wireless reference signal comprises a Positioning Reference Signal (PRS).

12. The mobile device of claim 11, wherein the one or more processing units are configured to determine the position of the mobile device relative to the network entity based, at least in part, on the PRS.

13. The mobile device of claim 10, wherein the one or more processing units are further configured to determine the difference between the time the network entity transmits the first wireless reference signal and the time the network entity transmits the second wireless reference signal based on the timing information in the configuration.

14. The mobile device of claim 10, wherein, for each of the one or more wireless reference signals, the configuration comprises:
a signal type of the respective wireless reference signal,
a duration of the respective wireless reference signal,
a center frequency and bandwidth of the respective wireless reference signal, or
a period and prepetition factor of the respective wireless reference signal, or
any combination thereof.

15. The mobile device of claim 10, wherein, for each of the one or more wireless reference signals, the timing information comprises:
a time at which the respective reference signal is transmitted by the network entity, or
a time at which the respective reference signal is expected to be received at the mobile device, or
any combination thereof.

16. The mobile device of claim 10, wherein the one or more processing units are further configured to receive a location of the network entity from the server, and wherein the one or more processing units are further configured to determine the position of the mobile device relative to the network entity based, at least in part, on the location of the network entity.

17. The mobile device of claim 10, wherein, to provide the position of the object with the mobile device, the one or more processing units are further configured to provide the position of the object to an application executed by the mobile device.

18. The mobile device of claim 10, wherein the one or more processing units are further configured to, prior to receiving the configuration from the server, send a request via the wireless communication interface to the server to perform RF sensing.

19. A device comprising:
means for receiving a configuration from a server, wherein the configuration includes timing information for each of one or more wireless reference signals transmitted by a network entity of a wireless communications network;
means for determining, based on the configuration:
a first Time of Arrival (ToA) of a Line-Of-Sight (LOS) wireless signal at the device, wherein the LOS wireless signal comprises a first wireless reference signal of the one or more wireless reference signals; and
a second ToA of an echo signal at the device, wherein the echo signal comprises a reflection, from an object, of a second wireless reference signal of the one or more wireless reference signals;
means for determining a position of the device relative to the network entity;
means for determining a position of the object based on:
a time difference between the first ToA and the second ToA,
a difference between a time the network entity transmits the first wireless reference signal and a time the network entity transmits the second wireless reference signal, and
the position of the device relative to the network entity; and
means for providing the position of the object with the device.

20. The device of claim 19, wherein the first wireless reference signal comprises a Positioning Reference Signal (PRS).

21. The device of claim 20, wherein determining the position of the device relative to the network entity is based, at least in part, on the PRS.

22. The device of claim 19, further comprising means for determining the difference between the time the network entity transmits the first wireless reference signal and the time the network entity transmits the second wireless reference signal based on the timing information in the configuration.

23. The device of claim 19, wherein, for each of the one or more wireless reference signals, the configuration comprises:
a signal type of the respective wireless reference signal,
a duration of the respective wireless reference signal,
a center frequency and bandwidth of the respective wireless reference signal, or
a period and prepetition factor of the respective wireless reference signal, or
any combination thereof.

24. A non-transitory computer-readable medium storing instructions for performing radio frequency (RF) sensing with a mobile device in a wireless communications network, the instructions comprising code for:
receiving a configuration from a server, wherein the configuration includes timing information for each of one or more wireless reference signals transmitted by a network entity of the wireless communications network;
determining, based on the configuration:
a first Time of Arrival (ToA) of a Line-Of-Sight (LOS) wireless signal at the mobile device, wherein the LOS wireless signal comprises a first wireless reference signal of the one or more wireless reference signals; and
a second ToA of an echo signal at the mobile device, wherein the echo signal comprises a reflection, from an object, of a second wireless reference signal of the one or more wireless reference signals;
determining a position of the mobile device relative to the network entity;

determining a position of the object based on:
- a time difference between the first ToA and the second ToA,
- a difference between a time the network entity transmits the first wireless reference signal and a time the network entity transmits the second wireless reference signal, and
- the position of the mobile device relative to the network entity; and providing the position of the object with the mobile device.

* * * * *